US011938940B2

(12) United States Patent
Aso

(10) Patent No.: US 11,938,940 B2
(45) Date of Patent: Mar. 26, 2024

(54) NATURAL LANE CHANGE CONTROL APPARATUS

(71) Applicant: SUBARU CORPORATION, Tokyo (JP)

(72) Inventor: Toyokazu Aso, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 166 days.

(21) Appl. No.: 17/491,880

(22) Filed: Oct. 1, 2021

(65) Prior Publication Data

US 2022/0105942 A1 Apr. 7, 2022

(30) Foreign Application Priority Data

Oct. 2, 2020 (JP) ................................ 2020-168088

(51) Int. Cl.
*B60W 30/18* (2012.01)
*B60W 10/20* (2006.01)
*B60W 30/12* (2020.01)
*B60W 40/04* (2006.01)
*G06V 20/56* (2022.01)
*G06V 20/58* (2022.01)

(52) U.S. Cl.
CPC ...... *B60W 30/18163* (2013.01); *B60W 10/20* (2013.01); *B60W 30/12* (2013.01); *B60W 40/04* (2013.01); *G06V 20/58* (2022.01); *G06V 20/584* (2022.01); *G06V 20/588* (2022.01); *B60W 2552/53* (2020.02); *B60W 2710/20* (2013.01)

(58) Field of Classification Search
CPC ................... B60W 30/18163; G06V 20/58
See application file for complete search history.

(56) References Cited

U.S. PATENT DOCUMENTS

| 2019/0084619 | A1* | 3/2019 | Mizoguchi | ........... G05D 1/0212 |
| 2020/0070826 | A1* | 3/2020 | Watanabe | .............. G08G 1/166 |
| 2021/0276561 | A1* | 9/2021 | Hayakawa | ............ B60W 30/08 |
| 2022/0172652 | A1* | 6/2022 | Yagyu | ...................... G08G 1/16 |

FOREIGN PATENT DOCUMENTS

| JP | 2019-51837 A | 4/2019 |
| JP | 2020-32802 A | 3/2020 |

* cited by examiner

*Primary Examiner* — Jess Whittington
(74) *Attorney, Agent, or Firm* — TROUTMAN PEPPER HAMILTON SANDERS LLP

(57) ABSTRACT

A traveling control apparatus to be applied to a vehicle includes a traveling controller, a traveling environment recognizer, a target traveling course setting section, a steering assist controller, a target traveling course switching section, and an own-vehicle position and own-vehicle traveling course estimator. The own-vehicle position and own-vehicle traveling course estimator estimates a first lateral position of the vehicle, an estimated traveling course along which the vehicle is to travel after start of a lane change control, and a second lateral position of the vehicle to be reached after the vehicle travels for a predetermined time period from the first lateral position. The target traveling course switching section regards the vehicle as traveling within an adjacent lane, and switches a target traveling course from within a traveling lane to within the adjacent lane, if the two lateral positions are determined as each satisfying a relationship with a predetermined threshold.

10 Claims, 5 Drawing Sheets

NATURAL LANE CHANGE CONTROL APPARATUS

CROSS-REFERENCE TO RELATED APPLICATION

The present application claims priority from Japanese Patent Application No. 2020-168088 filed on Oct. 2, 2020, the entire contents of which are hereby incorporated by reference.

BACKGROUND

The technology relates to a traveling control apparatus.

For vehicles such as automobiles, an automatic driving control technique of causing a vehicle to travel automatically without requiring a driver's driving operation has been recently developed. In addition, traveling control apparatuses configured to execute various traveling controls using this automatic driving control technique to assist the driver's driving operation have been recently proposed and put into practical use. For example, reference is made to Japanese Unexamined Patent Application Publication (JP-A) Nos. 2020-32802 and 2019-51837.

SUMMARY

An aspect of the technology provides a traveling control apparatus to be applied to a vehicle. The traveling control apparatus includes a traveling controller, a traveling environment recognizer, a target traveling course setting section, a steering assist controller, a target traveling course switching section, and an own-vehicle position and own-vehicle traveling course estimator. The traveling controller is configured to execute at least a lane keep assist control of causing the vehicle to travel along a target traveling course set within a traveling lane, and a lane change control of causing the vehicle traveling along the target traveling course to make a lane change from the traveling lane to an adjacent lane adjacent to the traveling lane. The traveling environment recognizer is configured to acquire surrounding environment information that is information on a surrounding environment of the vehicle, and to recognize left and right lane lines of the traveling lane on the basis of the acquired surrounding environment information. The target traveling course setting section is configured to set, on the basis of the left and right lane lines of the traveling lane recognized by the traveling environment recognizer, the target traveling course within the traveling lane by setting two target setting lines along the respective left and right lane lines of the traveling lane. The steering assist controller is configured to perform at least steering assistance for the lane keep assist control and steering assistance for the lane change control. The target traveling course switching section is configured to switch the target traveling course set on the traveling lane by the target traveling course setting section, from within the traveling lane to within the adjacent lane to which the lane change is to be made, at a predetermined timing during the execution of the lane change control. The own-vehicle position and own-vehicle traveling course estimator is configured to estimate a first lateral position of the vehicle with respect to a first target setting line closer to the adjacent lane, out of the two target setting lines, at a predetermined time after start of the lane change control, to estimate an estimated traveling course along which the vehicle is to travel after the start of the lane change control, and to estimate a second lateral position of the vehicle with respect to the first target setting line closer to the adjacent lane. The second lateral position is reached after the vehicle travels for a predetermined time period from the first lateral position of the vehicle. The traveling controller is configured to perform a control of permitting intervention of the lane change control during the execution of the lane keep assist control, executing the lane change control by interrupting the lane keep assist control being executed, and resuming the lane keep assist control after completion of the lane change control. The target traveling course switching section is configured to regard the vehicle as traveling within the adjacent lane to which the lane change is to be made, and switch the target traveling course from within the traveling lane to within the adjacent lane, in a case where the first lateral position of the vehicle and the second lateral position of the vehicle at the predetermined timing during the execution of the lane change control are determined as each satisfying a relationship with a predetermined threshold.

An aspect of the technology provides a traveling control apparatus to be applied to a vehicle. The traveling control apparatus includes circuitry. The circuitry is configured to execute at least a lane keep assist control of causing the vehicle to travel along a target traveling course set within a traveling lane, and a lane change control of causing the vehicle traveling along the target traveling course to make a lane change from the traveling lane to an adjacent lane adjacent to the traveling lane. The circuitry is configured to acquire surrounding environment information that is information on a surrounding environment of the vehicle, and recognize left and right lane lines of the traveling lane on the basis of the acquired surrounding environment information. The circuitry is configured to set, on the basis of the recognized left and right lane lines of the traveling lane, the target traveling course within the traveling lane by setting two target setting lines along the respective left and right lane lines of the traveling lane. The circuitry is configured to perform at least steering assistance for the lane keep assist control and steering assistance for the lane change control. The circuitry is configured to switch the target traveling course set on the traveling lane, from within the traveling lane to within the adjacent lane to which the lane change is to be made, at a predetermined timing during the execution of the lane change control. The circuitry is configured to estimate a first lateral position of the vehicle with respect to a first target setting line closer to the adjacent lane, out of the two target setting lines, at a predetermined time after start of the lane change control, estimate an estimated traveling course along which the vehicle is to travel after the start of the lane change control, and estimate a second lateral position of the vehicle with respect to the first target setting line closer to the adjacent lane. The second lateral position is reached after the vehicle travels for a predetermined time period from the first lateral position of the vehicle. The circuitry is configured to perform a control of permitting intervention of the lane change control during the execution of the lane keep assist control, executing the lane change control by interrupting the lane keep assist control being executed, and resuming the lane keep assist control after completion of the lane change control. The circuitry is configured to regard the vehicle as traveling within the adjacent lane to which the lane change is to be made, and switch the target traveling course from within the traveling lane to within the adjacent lane, in a case where the first lateral position of the vehicle and the second lateral position of the vehicle at the predetermined timing during the execution of the lane change control are determined as each satisfying a relationship with a predetermined threshold.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
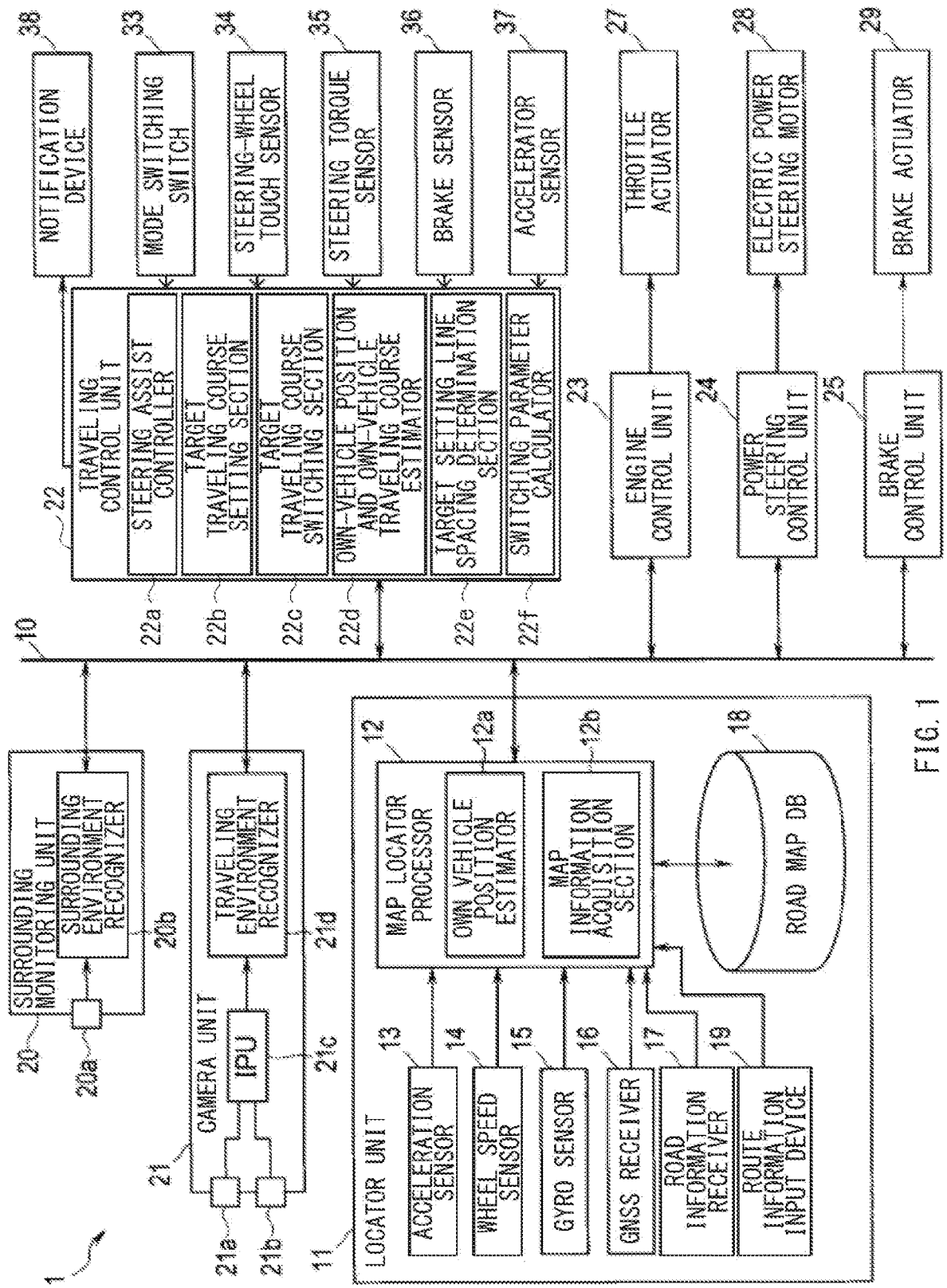
FIG. 1 is a block diagram illustrating an outline configuration of a traveling control apparatus according to one example embodiment of the technology.

Various lane keep assist controls have been proposed and put into practical use, for example, for an existing traveling control apparatus. The lane keep assist controls involve traveling assistance that keeps a vehicle mounted with the traveling control apparatus traveling within a predetermined traveling lane by: recognizing a lane line, for example, marked on a road on which the vehicle is traveling, on the basis of captured image data of an imaging device (e.g., a camera); setting a target traveling course along which the vehicle is to be caused to travel, within the traveling lane on which the vehicle is traveling, on the basis of various pieces of information regarding the recognized lane line and other information; and causing the vehicle to travel along the set target traveling course. Examples of the lane line include a roadway centerline, a roadway edge line, and a lane boundary. Examples of the other information include information acquired by using other various sensing devices, and various pieces of information acquired from external equipment. Such a lane keep assist control is disclosed in, for example, JP-A No. 2020-32802.

Various lane change controls have also been proposed and put into practical use, for example, for an existing traveling control apparatus. The lane change controls involve causing a vehicle traveling while executing the above-described lane keep assist control to make a lane change from a traveling lane on which the vehicle is traveling to an adjacent lane adjacent to the traveling lane. Such a lane change control is disclosed in, for example, JP-A No. 2019-51837.

In executing the lane keep assist control, the existing traveling control apparatus recognizes left and right lane lines of a traveling lane on which the own vehicle is traveling, for example, by a device such as a camera, and sets a target traveling course on the basis of information regarding the recognized left and right lane lines, as described above. The target traveling course set in this case is a region between two target setting lines. The two target setting lines are left and right target setting lines extending along respective inner edges of the recognized left and right lane lines and set on the traveling lane on which the vehicle is traveling (hereinafter, referred to as an own lane).

Note that, on a typical two or more lane road of a normal form, at least one of left and right lane lines of the own lane may serve as a lane boundary between the own lane and an adjacent lane adjacent to the own lane (hereinafter, simply referred to as an adjacent lane). In this case, one of the left and right lane lines of the own lane, and one of left and right lane lines of the adjacent lane are shared as the lane boundary between the lanes. Examples of the typical road include a highway and an expressway.

Therefore, on the two or more lane road of a normal form, the existing traveling control apparatus similarly recognizes not only the left and right lane lines of the own lane, but also at least the lane line closer to the own lane and also serving as the lane boundary, out of the left and right lane lines of the adjacent lane.

In general, a lane line, for example, of a typical form marked on a road to indicate a traveling lane for a vehicle to travel on mainly includes one solid line or dashed line having a color such as white and a predetermined width and extending along a traveling direction. Examples of such lane lines include typical main lane lines called a roadway centerline, a roadway edge line, and a lane boundary.

In addition to these markings, other types of lane boundaries may be marked. For example, a lane boundary may have a form in which a road marking including a short-dashed line is provided along one side edge or both side edges of the lane line of a typical form. Examples of the road marking include markings called deceleration marks and dotted-line marks. In another example, a plurality of lane lines may be marked in parallel to serve as one lane boundary. These types of lane boundaries have a form with a wide strip shape as a whole. Hence, in the following description, these types of wide strip-shaped lane boundaries are each referred to as a wide lane boundary strip. A lane boundary including a lane line of a typical form is referred to as a normal lane boundary line.

In a case of performing a control of causing the lane change control to intervene while the traveling control apparatus is executing the lane keep assist control, i.e., while causing the vehicle to travel along the set target traveling course, it is usually desired to perform the control to allow the lane keep assist control to be continued smoothly. This control is achievable by interrupting the lane keep assist control being executed, and resuming the interrupted lane keep assist control on a lane after the movement after the own vehicle completes a lane change from the own lane to the adjacent lane under the lane change control that has intervened.

Therefore, in a case where the control of causing the lane change control to intervene is performed while the traveling control apparatus is executing the lane keep assist control, a way may be devised for smooth takeover to the lane keep assist control after the completion of the lane change control. A conceivable way is, for example, to perform a process of resetting the target traveling course set on the own lane for the lane keep assist control, within the adjacent lane to which the lane change is to be made, at a predetermined timing during the execution of the lane change control. It have been demanded that such a way of control be devised to achieve a natural traveling control without awkwardness by smoothly switching between the lane keep assist control and the lane change control.

For example, assume a two or more lane road having a normal lane boundary line of a normal form in which a lane boundary between the own lane and an adjacent lane includes a solid line or dashed line marking, such as a single white line. In a case of such a road, one of left and right target setting lines of a target traveling course on the own lane is set along one side edge on the own lane side with respect to the lane boundary, i.e., the normal lane boundary line, between the own lane and the adjacent lane. In this case, in a case of resetting the target traveling course on the adjacent lane to which a lane change is to be made, an expected target setting line is set along one side edge on the adjacent lane side with respect to the same lane boundary shared by the left and right lanes, i.e., the normal lane boundary line.

The solid line or dashed line marking, such as a white line, used as a typical lane boundary, i.e., a normal lane boundary line, is restricted to a width dimension of about 15 cm to about 20 cm, for example. Therefore, in this case, a spacing in a lateral direction between two target setting lines set at both side edges across the lane boundary between the own lane and the adjacent lane is only a little wider than the width dimension of the lane boundary (e.g., 15 cm to 20 cm). The two target setting lines include the target setting line on the own lane side and the target setting line on the adjacent lane side. The spacing may also be referred to as a separation distance.

Also in case of a road having the above-described wide lane boundary strip as the lane boundary between the own lane and the adjacent lane, target setting lines defining the target traveling course are set along both side edges across the wide lane boundary strip, as in the case of the normal lane boundary line.

However, in a case of a road having a wide lane boundary strip, a spacing between the setting lines for the target traveling course set across the wide lane boundary strip may be, for example, a separation distance of 500 mm or more. For example, this applies to a case where the wide lane boundary strip has a form in which the above-described marking such as deceleration marks is provided along both side edges of a normal lane boundary line, and a case where a plurality of normal lane boundary lines are arranged substantially in parallel in a width direction of the road to serve as a wide lane boundary strip as a whole.

As described above, the lane boundary to be straddled by the vehicle in making a lane change has various forms. Accordingly, in a case of performing the control of causing the lane change control to intervene during the execution of the lane keep assist control, uniformly defining various timings of switching various settings, for example, regardless of a road situation can lead to the following concerns. For example, the lane change control being executed can be canceled against a driver's intention or the traveling of the vehicle can become unstable, depending on the form of the lane boundary related to the lane change. Examples of the form of the lane boundary include a type, such as normal or a wide strip.

Hence, to achieve a natural traveling control without awkwardness in performing the control of causing the lane change control to intervene during the execution of the lane keep assist control in an existing traveling control apparatus, it is desired to devise the control in consideration of appropriate settings, for example, in accordance with the road situation.

It is desirable to provide a traveling control apparatus that makes it possible to perform a natural and stable lane change control without awkwardness in performing a control of causing a lane change control to intervene during execution of a lane keep assist control, and also to achieve a stable traveling control by smoothly performing takeover to the lane keep assist control after the lane change control is completed.

In the following, some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a shape of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference signs to avoid redundant description.

A traveling control apparatus according to an example embodiment of the technology may be mounted on a vehicle such as an automobile, and may perform a traveling control for assistance with a driving operation performed by a driver of the vehicle. The traveling control apparatus according to the example embodiment may use a sensing device, such as an in-vehicle camera unit or a radar, to acquire information regarding a front environment and a surrounding environment of the vehicle. For example, the traveling control apparatus may acquire information regarding the surrounding environment of the vehicle, including: another vehicle, such as a preceding vehicle, a subsequent vehicle, an oncoming vehicle, or a side-by-side vehicle, traveling ahead of and around the vehicle; a mobile body such as a bicycle or a pedestrian; a building; various constructions; and an obstacle. Hereinafter, the information regarding the front environment and the surrounding environment may simply be referred to as surrounding environment information. The traveling control apparatus may also recognize a road situation, for example, on the basis of road map information acquired from external equipment such as a high-precision road map database by communication, in addition to the surrounding environment information acquired in the above manner. The road situation may include information regarding a preceding vehicle, a subsequent vehicle, various constructions, and an obstacle. The traveling control apparatus according to the example embodiment may use these various pieces of information (e.g., the surrounding environment information, the map information, and recognized information) as appropriate, as information to be used in executing the traveling control for the assistance with the driver's driving operation.

The traveling control apparatus according to the example embodiment is configured to execute at least a lane keep assist control of causing the vehicle to travel along a target traveling course set within a traveling lane on which the vehicle is traveling, and a lane change control of causing the vehicle traveling along the target traveling course to make a lane change to an adjacent lane. In the example embodiment, the traveling control apparatus is configured to cause the lane change control to intervene during the execution of the lane keep assist control. Concerns raised in performing such control switching may be solved in a devised way described in the following description.

A description is given first of an outline configuration of a traveling control apparatus according to an example embodiment of the technology, with reference to FIG. 1. FIG. 1 is a block diagram illustrating an outline configuration of a traveling control apparatus 1 according to the example embodiment of the technology.

The traveling control apparatus 1 according to the example embodiment may have a configuration substantially similar to a configuration of an existing same type of traveling control apparatus. Therefore, in describing the configuration of the traveling control apparatus 1 according to the example embodiment, only a major configuration related to the technology is described. Assuming that a minor configuration of the traveling control apparatus 1 according to the example embodiment is substantially similar to that of the existing traveling control apparatus, detailed description of a configuration other than the configuration directly related to the technology is omitted. FIG. 1 illustrates only the major configuration of the traveling control apparatus 1 according to the example embodiment, and does not illustrate the configuration not directly related to the technology.

As illustrated in FIG. 1, the traveling control apparatus 1 according to the example embodiment may include a locator unit 11, a surrounding monitoring unit 20, a camera unit 21, a traveling control unit 22, an engine control unit 23, a power steering control unit 24, and a brake control unit 25, for example, as main units. In one embodiment, the traveling control unit 22 may serve as a "traveling controller".

The locator unit 11, the surrounding monitoring unit 20, and the camera unit 21 may be sensor units for recognition of a traveling environment inside and outside the vehicle, and may serve as environment recognition devices. The locator unit 11, the surrounding monitoring unit 20, and the camera unit 21 may be present as completely independent units, without depending on each other.

The locator unit 11, the surrounding monitoring unit 20, the camera unit 21, and the control units including the traveling control unit 22, the engine control unit 23, the power steering control unit 24, and the brake control unit 25 may be coupled to each other via an in-vehicle communication line 10, such as a controller area network (CAN), and may share data on an as-needed basis.

The locator unit 11 may serve as an information acquisition device that estimates a position of the own vehicle (i.e., an own vehicle position) on a road map, and acquires road map information, for example, mainly on a space ahead of the estimated own vehicle position.

The locator unit 11 may include a map locator processor 12, an acceleration sensor 13, a wheel speed sensor 14, a gyro sensor 15, a global navigation satellite system (GNSS) receiver 16, a road information receiver 17, a high-precision road map database (DB) 18 serving as a map information storage, and a route information input device 19, for example. The high-precision road map database 18 is indicated by a "road map DB" in FIG. 1.

The acceleration sensor 13, the wheel speed sensor 14, and the gyro sensor 15 may be various sensors to be used in estimating the position of the own vehicle (i.e., the own vehicle position). For example, the acceleration sensor 13 may detect a longitudinal acceleration of the own vehicle. The wheel speed sensor 14 may detect a speed of rotation, i.e., a wheel speed, of each of a front-right wheel, a front-left wheel, a rear-right wheel, and a rear-left wheel. The gyro sensor 15 may detect an angular velocity or angular acceleration of the own vehicle. The acceleration sensor 13, the wheel speed sensor 14, and the gyro sensor 15 may be an autonomous traveling sensor group configured to acquire a driving state of the own vehicle, and may be coupled to the input side of the map locator processor 12.

The autonomous traveling sensor group including the acceleration sensor 13, the wheel speed sensor 14, and the gyro sensor 15 may be a sensor group provided to allow for autonomous traveling in a situation, e.g., inside a tunnel, where low reception sensitivity from unillustrated GNSS satellites inhibits effective reception of the positioning signals. The autonomous traveling sensor group may include unillustrated sensors, for example, a vehicle speed sensor and a yaw rate sensor, in addition to the acceleration sensor 13, the wheel speed sensor 14, and the gyro sensor 15.

The GNSS receiver 16 may be configured to acquire the own vehicle position. The GNSS receiver 16 may be a reception device that receives various pieces of information from a GNSS, for example. In other words, the GNSS receiver 16 may receive positioning signals from a plurality of positioning satellites. The GNSS receiver 16 may output the acquired positioning signals to the map locator processor 12 of the locator unit 11. The map locator processor 12 may estimate the own vehicle position, i.e., a latitude and a longitude, on the basis of the positioning signals from the positioning satellites received by the GNSS receiver 16. Accordingly, the GNSS receiver 16 may be coupled to the input side of the map locator processor 12.

The road information receiver 17, the high-precision road map database 18 serving as a storage, and the route information input device 19 may also be coupled to the map locator processor 12.

The road information receiver 17 may be a reception device that receives and acquires various pieces of information accumulated in an unillustrated cloud server coupled via an unillustrated predetermined base station or the Internet. Non-limiting examples of the various pieces of information may include information to be used for automatic driving and map information. The road information receiver 17 may output the acquired various pieces of information to the map locator processor 12 of the locator unit 11. Note that the road information receiver 17 may further be configured to transmit various pieces of information of the own vehicle to the unillustrated base station or cloud server, for example, to serve as a road information transmission-reception device.

The map locator processor 12 may perform map matching of the own vehicle position on the map on the basis of the map information received by the road information receiver 17, and may construct a target traveling route from an inputted destination to the own vehicle position. On the constructed target traveling route, the map locator processor 12 may further set a target traveling route for execution of the automatic driving, for several kilometers ahead of the own vehicle. Items to be set as the target traveling route may include various items, such as a lane on which the own vehicle is to be caused to travel (e.g., on which lane the vehicle is to be caused to travel in a case where there are three lanes), a lane change to be made to pass a preceding vehicle, and a timing of starting the lane change.

The high-precision road map database 18 may mainly include a large-capacity storage medium, such as a hard disk drive (HDD) or a solid state drive (SSD). The high-precision road map database 18 may have known high-precision road map information, i.e., a local dynamic map, stored therein. The high-precision road map information may have the same hierarchical structure as, for example, a global dynamic map stored in the unillustrated cloud server. The high-precision road map information may have a hierarchical structure in which additional map information is superimposed on the lowest static information layer as a base. The additional map information may be provided for assistance with the automatic driving.

The additional map information may include static positional information and dynamic positional information. Non-limiting examples of the static positional information may include types of roads (e.g., a general road and an expressway), a road shape, left and right lane lines, an exit from an expressway or a bypass road, for example, a length or start and end positions of an entrance to or an exit from a branch lane or a merging lane coupled to a junction, a service area, or a parking area. Non-limiting examples of the left and right lane lines may include a roadway centerline, a roadway edge line, and a lane boundary. Non-limiting examples of the dynamic positional information may include information regarding traffic congestion, and traffic restrictions due to an accident or construction work.

In a case where the target traveling route is set by the map locator processor 12, the additional map information may be continuously acquired from the global dynamic map and sequentially updated, as surrounding information to be used to cause the own vehicle to travel autonomously along the set target traveling route.

The high-precision road map information may also hold lane data to be involved in the execution of the automatic driving. Non-limiting examples of the lane data may include lane width data, lane center position coordinate data, lane forwarding azimuth angle data, and speed limit data. These pieces of information, such as the lane data, may be held at intervals of several meters in each lane on the road map.

The route information input device 19 may be a terminal device to be operated by a person riding on the vehicle, such as the driver or an occupant. The route information input device 19 may be configured to allow for a collective input of a series of pieces of information to be involved in setting of the traveling route in the map locator processor 12. The setting of the traveling route may include, for example, setting of a destination or a via-point. Non-limiting examples of the via-point may include a service area on an expressway.

In one example, the route information input device 19 may include an input unit (e.g., a touchscreen of a monitor) of a car navigation system, a mobile terminal such as a smart phone, and/or a personal computer, without limitation. The route information input device 19 may be coupled to the map locator processor 12 by wire or wirelessly. Thus, the route information input device 19 may accept an operation, by the driver or an occupant, of inputting information regarding the destination or the via-point. Non-limiting examples of such information may include a name of facilities, an address, and a telephone number. The information thus inputted may be read by the map locator processor 12. The map locator processor 12 may set positional coordinates, i.e., a latitude and a longitude, of the destination and/or the via-point inputted from the route information input device 19.

The map locator processor 12 may include an own vehicle position estimator 12a and a map information acquisition section 12b, for example.

The own vehicle position estimator 12a may be configured to estimate the own vehicle position. The own vehicle position estimator 12a may acquire the positional coordinates, i.e., the latitude and the longitude, of the own vehicle on the basis of the positioning signals received by the GNSS receiver 16. The own vehicle position estimator 12a may perform map-matching of the acquired positional coordinates on the route map information, to thereby estimate the own vehicle position, i.e., a current location, on the road map.

In an environment, e.g., inside a tunnel, in which lowered sensitivity of the GNSS receiver 16 inhibits reception of valid positioning signals from the positioning satellites, the own vehicle position estimator 12a may switch to autonomous navigation, and estimate the own vehicle position, i.e., the latitude and the longitude, on the road map. The autonomous navigation may estimate the own vehicle position on the basis of various data, including vehicle speed data determined on the basis of the wheel speed detected by the wheel speed sensor 14, angular velocity data detected by the gyro sensor 15, and longitudinal acceleration data detected by the acceleration sensor 13.

The map information acquisition section 12b may construct target traveling route information in accordance with a preset route condition, on the basis of the positional information, i.e., the latitude and the longitude, of the own vehicle position estimated by the own vehicle position estimator 12a, and on the basis of the positional information, i.e., the latitude and the longitude, of the destination and/or the via-point inputted from the route information input device 19 by the driver, for example. The target traveling route may be routed from the current location to the destination. In other words, the target traveling route information may indicate a route from the own vehicle position to the destination on the high-precision road map information. If any via-point is set, the target traveling route may be routed from the own vehicle position to the destination through the via-point. Non-limiting examples of the preset route condition may include, for example, a recommended route and a fastest route. In this case, the own vehicle position estimator 12a may identify the traveling lane on which the own vehicle is traveling, and acquire the road shapes of the traveling lane and the merging lane, for example, stored in the road map data, for sequential storage of these pieces of information. The map information acquisition section 12b may transmit the target traveling route information to the own vehicle position estimator 12a.

In this manner, the map locator processor 12 may perform map-matching of the own vehicle position estimated by the own vehicle position estimator 12a on the road map to identify the current location of the own vehicle, and acquire road map information including information regarding a situation around the current location. In addition, the map information acquisition section 12b may set the target traveling route to be taken by the own vehicle.

The camera unit 21 may serve as a surrounding environment information acquisition device that recognizes an environment mainly in a traveling direction (e.g., a forward direction) of the own vehicle, and acquires information on the environment. The camera unit 21 may serve as a portion of a surrounding situation recognition device.

For example, the camera unit 21 may recognize various road surrounding situations, including another vehicle traveling ahead of or beside the own vehicle, three-dimensional objects including a mobile body traveling beside the own vehicle, a traffic light indication, a road sign, and a road marking such as a stop line or a lane line. Non-limiting examples of the other vehicle may include a preceding vehicle, a subsequent vehicle, an oncoming vehicle, and a side-by-side vehicle. Non-limiting examples of the mobile body may include a bicycle and a motorcycle. Non-limiting examples of the traffic light indication may include a lighting color, a blinking state, and an arrow direction. Non-limiting examples of the lane line may include a roadway centerline, a roadway edge line, and a lane boundary.

The camera unit 21 may be fixed to the upper middle of a front portion of a vehicle compartment of the own vehicle. The camera unit 21 may include an in-vehicle camera, i.e., a stereo camera, an image processing unit (IPU) 21c, and a traveling environment recognizer 21d. The in-vehicle camera may include a main camera 21a and a sub-camera 21b. The main camera 21a and the sub-camera 21b may be disposed at symmetrical positions with respect to a midpoint in a vehicle-width direction. The camera unit 21 may allow the main camera 21a to capture reference image data, and allow the sub-camera 21b to capture comparative image data. The respective two pieces of image data acquired by the main camera 21a and the sub-camera 21b may be subjected to predetermined image processing in the IPU 21c.

The traveling environment recognizer 21d may read the reference image data and the comparative image data that have been subjected to the image processing by the IPU 21c. The traveling environment recognizer 21d may recognize the same object in the two images on the basis of parallaxes between the two images, and calculate distance data by using the principle of triangulation. The distance data may be information on a distance from the own vehicle to the object. The traveling environment recognizer 21d may thereby recognize the object and the distance data thereof as front environment information.

The traveling environment recognizer 21d may also recognize a wide variety of road markings as front environment information, on the basis of the image data acquired by the camera unit 21 and processed by the IPU 21c. Non-limiting examples of the road markings may include lane lines that define left and right of the traveling lane on which the own vehicle is traveling. Non-limiting examples of the lane line may include a roadway centerline, a roadway edge line, and a lane boundary.

The front environment information may include, for example, a road shape of a traveling road on which the own vehicle is traveling. Non-limiting examples of the traveling road may include a merging lane and a traveling lane. Non-limiting examples of the road shape may include a mode of the left and right lane lines (e.g., a lane boundary), a road curvature (1/m) at the middle of the left and right lane lines, and a width from the left lane line to the right lane line, i.e., a lane width. The front environment information may further include, for example: an entrance and an exit of a road such as an expressway and a bypass road; a lane width between lane lines closer to a merging lane or a branch lane leading to a junction; an intersection; a crosswalk; a traffic light; a road sign; and a roadside obstacle. Non-limiting examples of the roadside obstacle may include a utility pole, a telephone pole, and a parked vehicle. The front environment information may further include, for example, various pieces of information including image information indicating a behavior of another vehicle that is traveling ahead of or around the own vehicle.

The above-described front environment information may include, as the mode of the left and right lane lines, information on a form of the lane line, for example. Non-limiting examples of the form of the lane line may include a form of a solid line or dashed line marking, such as a single white line. This form may hereinafter be referred to as a normal lane boundary line. Non-limiting examples of the form of the lane line may also include a form of a wide strip marking in which a marking such as deceleration marks is provided along both side edges of a normal lane boundary line, and a form in which a plurality of normal lane boundary lines are arranged in parallel to serve as a wide strip marking as a whole. These forms may hereinafter be referred to as a wide lane boundary strip. These various pieces of front environment information recognized by the traveling environment recognizer 21d may be supplied to the traveling control unit 22

The traveling environment recognizer 21d may perform a process such as predetermined pattern matching on two or more pieces of the image data, and thereby recognize a guard rail, a curb, and a three-dimensional object present along the road. In recognizing the three-dimensional object, the traveling environment recognizer 21d may recognize, for example, a type of the three-dimensional object, a distance to the three-dimensional object, a speed of the three-dimensional object, and a relative speed between the three-dimensional object and the own vehicle.

The main camera 21a and the sub-camera 21b may be also configured to acquire sound information together with the image information. In this case, the sound information acquired together with the image information may be included in the front environment information as sound information related to the front situation of the own vehicle.

The surrounding monitoring unit 20 may serve as a surrounding environment information acquisition device that recognizes a situation surrounding the own vehicle and acquire the situation as information. The surrounding monitoring unit 20 may serve as a portion of the surrounding situation recognition device. The surrounding monitoring unit 20 may include, for example, a surrounding situation recognition sensor 20a and a surrounding environment recognizer 20b.

The surrounding situation recognition sensor 20a may be, for example, an autonomous sensor group that serves to perform surrounding situation detection. The surrounding situation recognition sensor 20a may include, for example, a sensing device such as an ultrasonic sensor, a millimeter-wave radar, a light detection and ranging (LiDAR), a camera, or a combination thereof.

In one example, the surrounding situation recognition sensor 20a may include a plurality of millimeter-wave radars disposed at the four respective corners of the vehicle. For example, the millimeter-wave radars may be disposed at a left-front-side portion, a right-front-side portion, a left-rear-side portion, and a right-rear-side portion of the vehicle. Of these millimeter-wave radars, the left-front-side millimeter-wave radar and the right-front-side millimeter-wave radar may be disposed, for example, at a left-side portion and a right-side portion of a front bumper, respectively. The left-front-side millimeter-wave radar and the right-front-side millimeter-wave radar may be used to monitor a partial region around the vehicle which is difficult to recognize from the images acquired by the two cameras, i.e., the main camera 21a and the sub-camera 21b, of the camera unit 21. Such a partial region around the vehicle may be, for example, a left-front region, a right-front region, and side regions of the vehicle.

The left-rear-side millimeter-wave radar and the right-rear-side millimeter-wave radar may be provided, for example, at a left-side portion and a right-side portion of a rear bumper, respectively. The left-rear-side millimeter-wave radar and the right-rear-side millimeter-wave radar may be used to monitor a partial region around the vehicle which is difficult to monitor by the left-front-side millimeter-wave radar and the right-front-side millimeter-wave radar. Such a partial region around the vehicle may be, for example, a region from the sides to the rear of the vehicle.

The surrounding environment recognizer 20b may acquire surrounding environment information on the basis of an output signal from the surrounding situation recognition sensor 20a. The surrounding environment information may be information related to a mobile body around the own vehicle. Non-limiting examples of such a mobile body may include a side-by-side vehicle, a subsequent vehicle, and an oncoming vehicle.

The surrounding monitoring unit 20 and the camera unit 21 may serve as the surrounding environment information acquisition devices of the traveling control apparatus 1 of the example embodiment. The surrounding monitoring unit 20 and the camera unit 21 may together serve as the surrounding situation recognition device. The traveling environment recognizer 21d of the camera unit 21 and the surrounding environment recognizer 20b of the surrounding monitoring unit 20 may be coupled to the input side of the traveling control unit 22 via the in-vehicle communication line 10. Further, the traveling control unit 22 and the map locator processor 12 may be coupled to each other via the in-vehicle communication line 10 to freely perform bidirectional communication. Further, for example, a mode switching switch 33, a steering-wheel touch sensor 34, a steering torque sensor 35, a brake sensor 36, and an accelerator sensor 37 may be also coupled to the input side of the traveling control unit 22, as various switches or a group of sensors that detect vehicle internal environment information.

The mode switching switch 33 may be a group of switches that perform ON-OFF switching to allow the driver to select various driving modes or a plurality of control operations related to the drive assist control. The driver may be allowed to selectively perform ON-OFF switching of various driving modes by operating the mode switching switch 33. The various driving modes may include, for example, a manual driving mode, a first drive assist mode, a second drive assist mode, and a retreat mode.

The manual driving mode may be a driving mode that requires the driver to hold the steering wheel. For example, the manual driving mode may cause the own vehicle to travel in accordance with the driving operation performed by the driver. Non-limiting examples of the driving operation performed by the driver may include a steering operation, an acceleration operation, and a braking operation.

The first drive assist mode may be a semi-automatic driving mode that requires the driver to hold the steering wheel, but assists the operation of the driver in accordance with a situation such as the surrounding environment of the own vehicle recognized by the various sensors, while reflecting the driving operation performed by the driver.

In other words, the first drive assist mode may be a semi-automatic driving mode that controls units including the engine control unit 23, the power steering control unit 24, and the brake control unit 25 to perform various controls in combination, and thereby allows the own vehicle to travel along the set target traveling route and performs traveling control as appropriate while reflecting the driver's intention. The various controls may mainly include a preceding vehicle following control, the lane keep assist control, a lane departure prevention control, and the lane change control.

The second drive assist mode may not require the driver to hold the steering wheel or to perform an operation such as the acceleration operation or the braking operation. The second drive assist mode may be an automatic driving mode that controls the units including the engine control unit 23, the power steering control unit 24, and the brake control unit 25 to perform various traveling controls in combination, and thereby allows the own vehicle to automatically travel along the target traveling route. The various traveling controls may include the lane keep assist control.

The retreat mode may be an emergency driving mode that allows the own vehicle to stop automatically and safely, for example, in a case where: the own vehicle is traveling in the first or the second drive assist mode; the traveling of the own vehicle is not continuable any longer; and it is difficult to have the driver take over the driving operation, i.e., it is difficult to switch the driving mode to the manual driving mode or the first drive assist mode.

In addition, the mode switching switch 33 may include an operation member that allows the driver to selectively perform ON-OFF switching of each operation as desired by the driver. Each operation may be involved in, for example, the lane keep assist control, the lane departure prevention control, and the lane change control, out of the various controls executable by the traveling control apparatus 1 according to the example embodiment.

Typical examples of an operation serving as a trigger for start of the execution of the lane change control may include an operation on a turn signal lever by the driver. For example, in a case where the vehicle is traveling while executing the lane keep assist control, the driver may desire to make a lane change freely. In that case, when the driver operates the turn signal lever on the basis of his/her own intention, the traveling control apparatus 1 according to the example embodiment may switch the control from the lane keep assist control to the lane change control. Therefore, in the traveling control apparatus 1 according to the example embodiment, the turn signal lever thus configured to accept the driver's operation may be included in the examples of the mode switching switch 33.

The steering-wheel touch sensor 34 may be configured to detect a state in which the driver is holding an unillustrated steering wheel of a steering device, i.e., a steering-wheel holding state of the driver. The steering-wheel touch sensor 34 may be provided on a predetermined portion of the steering wheel of the vehicle. The steering-wheel touch sensor 34 may output an ON signal in a case where the driver is holding the predetermined portion of the steering wheel, i.e., the driver is in the steering-wheel holding state.

The steering torque sensor 35 may detect steering torque as an amount of the driving operation performed by the driver. The steering torque sensor 35 may be provided on an unillustrated steering shaft of the steering device of the vehicle.

The steering-wheel touch sensor 34 and the steering torque sensor 35 may both be sensors configured to recognize the steering-wheel holding state, i.e., the state in which the driver is holding the steering wheel of the own vehicle. The steering-wheel touch sensor 34 and the steering torque sensor 35 may serve as a steering-wheel holding state recognizer. The respective output signals from the steering-wheel touch sensor 34 and the steering torque sensor 35 may be supplied to the traveling control unit 22.

The brake sensor 36 may detect an amount by which a brake pedal is pressed, as an amount of the driving operation performed by the driver.

The accelerator sensor 37 may detect an amount by which an accelerator pedal is pressed, as an amount of the driving operation performed by the driver.

Coupled to the output side of the traveling control unit 22 may be a device such as a notification device 38. The notification device 38 may include, for example, a monitor panel and a speaker. The notification device 38 may notify the driver of a warning based on a situation recognized by the traveling control unit 22 on the basis of information such as the front environment information or the surrounding environment information acquired by the traveling environment recognizer 21d and the surrounding environment recognizer 20b. Non-limiting examples of such a warning may include a visual warning presentation on a display device such as the monitor panel, and an audio warning presentation with a sound generating device such as the speaker in a form of a voice or a horn sound.

In some cases, the notification device 38 may perform various presentations that are visually or audibly perceivable by the driver and that each suggest an operation to be performed by the driver. For example, the notification device 38 may perform a suggesting presentation as "please press down the brake pedal", "please release the accelerator pedal", or "please perform a steering correction operation".

The traveling control unit 22 permits intervention of the lane change control in a case where the vehicle is traveling while executing the lane keep assist control, interrupts the lane keep assist control being executed, and executes the indicated lane change control. In addition, after the completion of the lane change control, the traveling control unit 22 returns to the lane keep assist control before the interruption. The traveling control unit 22 may thus take over the control from the lane change control to the lane keep assist control, to allow the lane keep assist control to be continued within the traveling lane after the lane change (i.e., the adjacent lane before the lane change). The traveling control unit 22 may thus serve as the traveling controller.

The traveling control unit 22 may include a steering assist controller 22a, an own-vehicle position and own-vehicle traveling course estimator 22d, a target setting line spacing determination section 22e, and a switching parameter calculator 22f, for example.

The steering assist controller 22a may perform a control of assisting the traveling control involving a steering operation, out of the various controls executable by the traveling control apparatus 1 according to the example embodiment. For example, the steering assist controller 22a may assist a steering operation that allows the vehicle to stably travel within the traveling lane, and a steering operation performed by the driver when avoiding a risk, for example, that arises while the vehicle is traveling.

For example, the steering assist controller 22a performs a steering assist control during the execution of the lane keep assist control that allows the vehicle to travel along the set target traveling course. The target traveling course is set by a target traveling course setting section 22b to be described later. The steering assist controller 22a also performs a steering assist control during the execution of the lane change control that allows the own vehicle traveling under the lane keep assist control to make a lane change from the traveling lane on which the own vehicle is traveling (hereinafter, referred to as an own lane) to the adjacent lane adjacent to the own lane.

The steering assist controller 22a may include the target traveling course setting section 22b and a target traveling course switching section 22c, for example.

The target traveling course setting section 22b may acquire information regarding the left and right lane lines on the own lane, on the basis of information such as: the front environment information recognized by the traveling environment recognizer 21d of the camera unit 21, i.e., the surrounding situation recognition device; or the surrounding environment information of the own vehicle recognized by the surrounding environment recognizer 20b of the surrounding monitoring unit 20. On the basis of the information on the left and right lane lines, the target traveling course setting section 22b may calculate a road curvature at the middle of the left and the right lane lines of the own lane, and detect a lateral position deviation of the own vehicle in the vehicle-width direction using the middle of the left and the right lane lines as a reference.

The target traveling course setting section 22b sets two target setting lines (see reference signs EL and ER in FIG. 2 and other drawings to be described later) extending along respective inner side edges of the recognized left and right lane lines of the own lane. The target traveling course setting section 22b sets a region between these two target setting lines as the target traveling course. The target traveling course may be set within the own lane, and may serve as a virtual traveling course to be taken by the own vehicle in traveling, in causing the own vehicle to travel by executing the lane keep assist control.

Various methods are known for calculating the road curvature at the middle of the lane lines and the lane width. However, for example, the traveling environment recognizer 21d may recognize the left and the right lane lines by a binarization process using a brightness difference on the basis of the image information on the front traveling environment. The traveling environment recognizer 21d may calculate a curvature of each of the left and the right lane lines for each predetermined zone by a curve approximation formula based on a least-square method. The traveling environment recognizer 21d may calculate the lane width from a difference between the respective curvatures of the left and the right lane lines. Further, the traveling environment recognizer 21d may calculate the road curvature at the middle of the lane on the basis of the calculated curvatures of the left and the right lane lines and the calculated lane width of the own lane. Further, the traveling environment recognizer 21d may calculate the lateral position deviation of the own vehicle using the middle of the lane as a reference, i.e., an own vehicle lateral position deviation which is a distance from the middle of the lane to the middle of the own vehicle in the vehicle-width direction.

The target traveling course switching section 22c is configured to, in performing the control of causing the lane change control to intervene during the execution of the lane keep assist control, reset the target traveling course set within the own lane before the start of the lane change control, within the adjacent lane to which a lane change is to be made, as a target traveling course to be used. The switching of the target traveling course in this case may be performed at a predetermined timing that is after the start of the lane change control, during the execution of the lane change control, and before the completion of the lane change control. Details will be described later with reference to FIG. 2, FIG. 3, and other drawings.

In performing the control of causing the lane change control to intervene during the execution of the lane keep assist control, the own-vehicle position and own-vehicle traveling course estimator 22d estimates a first lateral position (see a reference sign C0 in FIG. 2 and FIG. 3 to be described later) with respect to the target setting line closer to the adjacent lane to which the lane change is to be made, out of the two target setting lines on the own lane at a predetermined time after the start of the lane change control. The target setting line closer to the adjacent lane may hereinafter be referred to as a first target setting line. Details thereof will be described later. See the reference sign ER in FIG. 2 and FIG. 4 and the reference sign EL in FIG. 3. The own-vehicle position and own-vehicle traveling course estimator 22d also estimates an estimated traveling course along which the own vehicle is to travel after the start of the lane change control. The own-vehicle position and own-vehicle traveling course estimator 22d also estimates a second lateral position (see a reference sign C1 in FIG. 2 and FIG. 3 to be described later) with respect to the first target setting line. The second lateral position is a position where the own vehicle is estimated to be present after a predetermined time period elapses from when the own vehicle is present at the first lateral position in a case where the own vehicle travels along the estimated traveling course.

The lane change control may use, for example, the driver's operation on the turn signal lever as a start trigger, as described above. In general, in a case where a vehicle is about to make a lane change, the driver has to start blinking of a turn signal lamp three seconds before the lane change to be executed. Therefore, a steering control, for example, involved in the lane change control is assumed to be actually started at least three seconds after the operation on the turn signal lever. In consideration of such assumption, the first lateral position of the own vehicle may be set, for example, at a position at a time at least three seconds after a start time of the lane change control, i.e., a time when the turn signal lever is operated. Note that the start time of the lane change control referred to in the following description takes such assumption into consideration. However, to avoid complication of description, the start time of the lane change control may simply be referred to as a "control start time".

The estimated traveling course along which the own vehicle is to travel after the start of the lane change control may be estimated on the basis of a turning curvature of the own vehicle when the own vehicle is present at the first lateral position, and an estimated movement distance of the own vehicle after elapse of a predetermined time period. The turning curvature of the own vehicle may be estimated on the basis of a yaw rate and a vehicle speed of the own vehicle. The estimated movement distance of the own vehicle after the elapse of the predetermined time period may be estimated on the basis of the vehicle speed. The own vehicle may be denoted by a reference sign "100" in FIG. 2 and other drawings.

In a case where the own vehicle travels along the estimated traveling course thus estimated, the second lateral position of the own vehicle to be reached after a predetermined time period (e.g., one second) elapses from when the own vehicle is present at the first lateral position may be estimated on the basis of the vehicle speed of the own vehicle. In this case, the vehicle speed of the own vehicle may be determined on the basis of the output of the wheel speed sensor 14.

The target setting line spacing determination section 22e may determine a spacing between the first target setting line (see the reference sign ER in FIG. 2 and FIG. 4 and the reference sign EL in FIG. 3 to be described later) and a second target setting line (see a reference sign RL in FIG. 2 and FIG. 4, a reference sign LR in FIG. 3, and the reference sign EL in FIG. 5 to be described later). The first target setting line may be the target setting line closer to the adjacent lane to which the lane change is to be made, out of the two target setting lines of the target traveling course set within the own lane. The second target setting line may be the target setting line closer to the own lane before the lane change, out of the two target setting lines of the target traveling course to be used after predetermined conditions to be described later are satisfied during the execution of the lane change control and switching is made to within the adjacent lane. Details will be described later.

In performing the control of causing the lane change control to intervene during the execution of the lane keep assist control, the switching parameter calculator 22f may calculate switching parameters (i.e., thresholds) to be used to set a timing of switching the target traveling course by the target traveling course switching section 22c, in accordance with the spacing between the target setting lines determined by the target setting line spacing determination section 22e. Details will be described later.

The traveling control unit 22 may, for example, perform various kinds of predetermined situation determination on the basis of: output information supplied from the traveling environment recognizer 21d of the camera unit 21 and the surrounding environment recognizer 20b of the surrounding monitoring unit 20, i.e., the surrounding situation recognition device; various pieces of information obtained via the map locator processor 12; the vehicle internal situation information acquired by the mode switching switch 33 and various sensors including the steering-wheel touch sensor 34, the steering torque sensor 35, the brake sensor 36, and the accelerator sensor 37; and any other suitable information. On the basis of results of the various kinds of predetermined situation determination, the traveling control unit 22 may perform a traveling control of the own vehicle by means of the units including the engine control unit 23, the power steering control unit 24, and the brake control unit 25.

In a case where an automatic driving zone is set on the target traveling route set by the map locator processor 12, the traveling control unit 22 may set a traveling route to perform an automatic driving control in the set automatic driving zone. The automatic driving zone may be a zone in which the automatic driving control is permitted. The traveling control unit 22 may also be configured to cause the own vehicle to automatically travel in the second drive assist mode along the target traveling route set from the own vehicle position estimated on the basis of various pieces of information in the automatic driving zone, by appropriately controlling the units including the engine control unit 23, the power steering control unit 24, and the brake control unit 25.

In such a case, the traveling control unit 22 may cause the own vehicle to travel, for example, by performing a control such as the preceding vehicle following control or the lane keep assist control on the basis of the front environment information recognized by the traveling environment recognizer 21d. For example, in a case where a preceding vehicle is detected, the traveling control unit 22 may thereby cause the own vehicle to follow the preceding vehicle. For example, in a case where no preceding vehicle is detected, the traveling control unit 22 may thereby cause the own vehicle to travel within a vehicle speed set within a speed limit. Further, the traveling control unit 22 may execute the steering assist control selected as appropriate, for example, the lane keep assist control, the lane departure prevention control, or the lane change control. The traveling control unit 22 may also perform a traveling control such as execution of a control for driver abnormality in some cases.

As described above, the traveling control unit 22 may be coupled to each of the control units including the engine control unit 23, the power steering control unit 24, and the brake control unit 25 via the in-vehicle communication line 10. This may allow the traveling control unit 22 to control each of the control units including the engine control unit 23, the power steering control unit 24, and the brake control unit 25.

Coupled to the output side of the engine control unit 23 may be a throttle actuator 27. The throttle actuator 27 may cause a throttle valve of an electronic control throttle provided in a throttle body of an engine to open and close. The throttle actuator 27 may cause the throttle valve to open and close on the basis of a driving signal supplied from the engine control unit 23 and thereby adjust an intake air flow rate. The throttle actuator 27 may thus generate a desired engine output.

Coupled to the output side of the power steering control unit 24 may be an electric power steering motor 28. The electric power steering motor 28 may provide steering torque to a steering mechanism with use of rotational force of an electric motor. In a driving mode other than the manual driving mode, i.e., in the first and the second drive assist modes and the retreat mode, the electric power steering motor 28 may be controlled to operate on the basis of a driving signal supplied from the power steering control unit 24. This may allow for execution of various steering assist controls that assist an operation performed on the steering wheel, i.e., steering. The steering torque sensor 35 may detect, for example, variation in the driving amount of the electric power steering motor 28 or the driving amount of the steering mechanism, and thereby present a steering torque value.

Coupled to the output side of the brake control unit 25 may be a brake actuator 29. The brake actuator 29 may be configured to adjust brake hydraulic pressure applied to a brake wheel cylinder provided on each wheel. When the brake actuator 29 is driven on the basis of a driving signal supplied from the brake control unit 25, the brake actuator 29 may generate braking force on each wheel by means of the brake wheel cylinder to thereby forcibly decelerate the vehicle.

For example, the map locator processor 12, the surrounding environment recognizer 20b, the traveling environment recognizer 21d, the traveling control unit 22, the engine control unit 23, the power steering control unit 24, and the brake control unit 25 may each include: a known microcomputer including, without limitation, a central processing unit (CPU), a random-access memory (RAM), a read-only memory (ROM), and a non-volatile storage; and a peripheral device thereof. The ROM may have, for example, a program to be executed by the CPU and fixed data such as a data table that have been stored therein in advance. The outline configuration of the traveling control apparatus 1 according to the example embodiment may be as described above.

Example workings of the traveling control apparatus according to the example embodiment of the technology having the above-described configuration are described below.

The example embodiment is described referring to an example case of a left-hand traffic road system in which the own vehicle travels on the left side. Therefore, in a case of applying the example embodiment to a right-hand traffic road system, "left" in the description should be read as "right", and "right" in the description should be read as "left". Thus, the example embodiment may be easily applicable to the right-hand traffic road system.

As described above, the traveling control apparatus 1 according to the example embodiment is configured to execute at least the lane keep assist control and the lane change control. The traveling control apparatus 1 is also configured to perform the control of causing the lane change control to intervene during the execution of the lane keep assist control.

Each of the lane keep assist control and the lane change control that are executed by the traveling control apparatus 1 according to the example embodiment may be substantially similar to known controls. In the example embodiment, in performing the control of causing the lane change control to intervene during the execution of the lane keep assist control, the control may be devised to make it possible to perform smooth control takeover by switching between the lane keep assist control and the lane change control.

For example, in performing the control of causing the lane change control to intervene during the execution of the lane keep assist control, the traveling control apparatus 1 according to the example embodiment may perform, at a predetermined timing after the start of the lane change control, a control of resetting the target traveling course set within the own lane before the start of the lane change control, within the adjacent lane to which a lane change is to be made, as a target traveling course to be used. The predetermined timing of switching the target traveling course may be a predetermined timing that is after the start of the lane change control, during the execution of the lane change control, and before the completion of the lane change control. Specific examples of the predetermined switching timing are described below.

Figure 2:
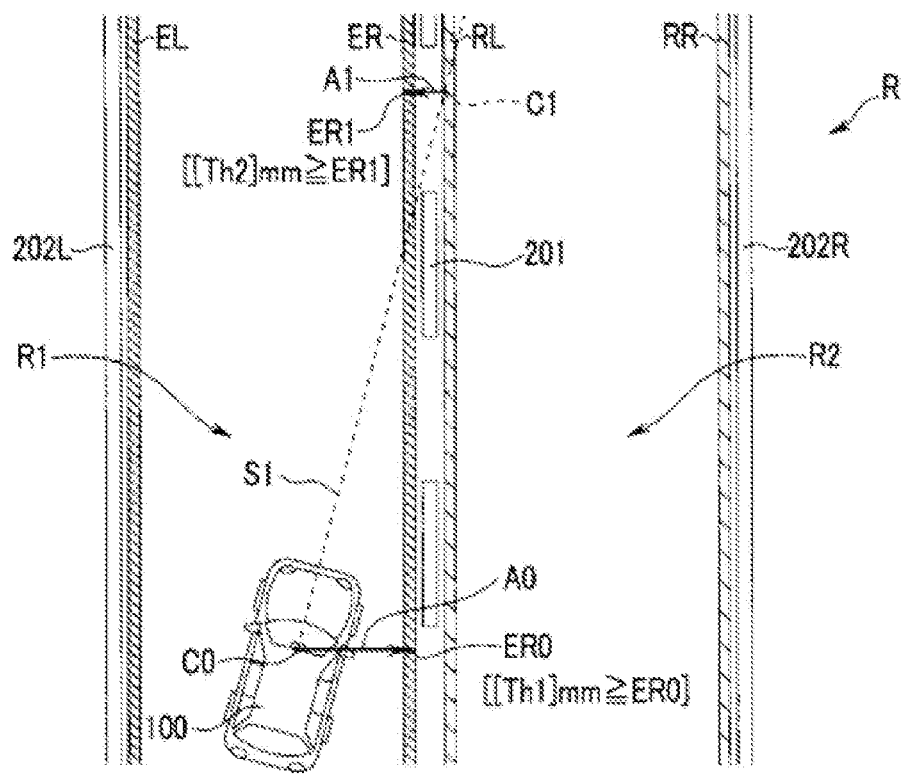
FIG. 2 is an explanatory diagram illustrating target traveling course switching timing conditions in performing a lane change control in the traveling control apparatus according to one example embodiment of the technology, in a case of a lane change from a left lane to a right lane on a road with a normal lane boundary line.
Figure 3:
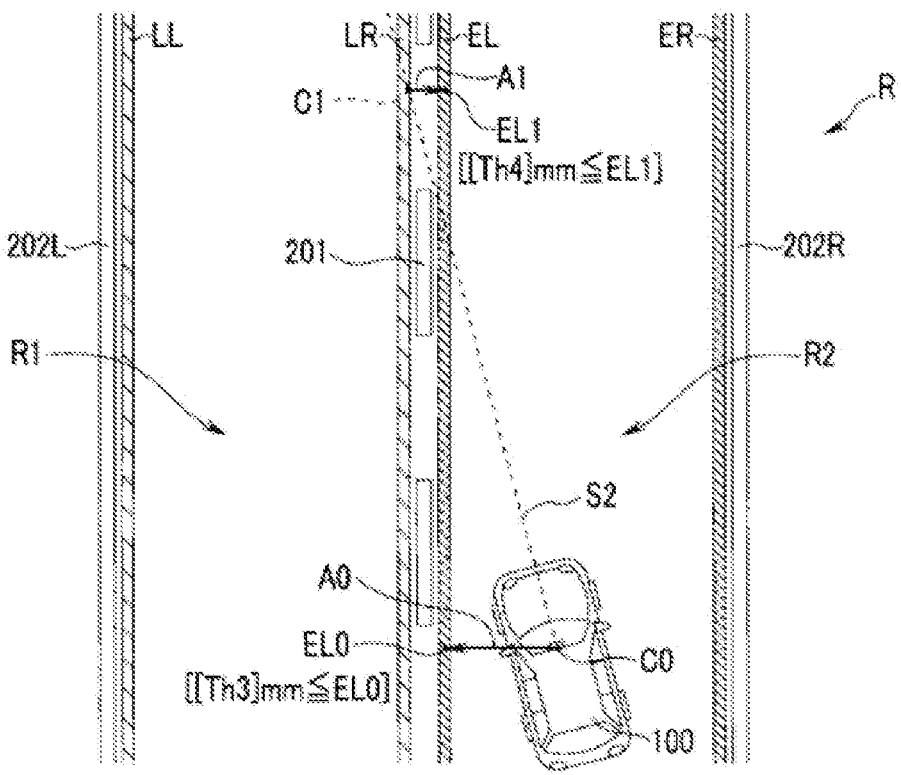
FIG. 3 is an explanatory diagram illustrating target traveling course switching timing conditions in performing the lane change control in the traveling control apparatus according to one example embodiment of the technology, in a case of a lane change from a right lane to a left lane on a road with a normal lane boundary line.

FIG. 2 and FIG. 3 are explanatory diagrams illustrating target traveling course switching timing conditions in performing the control of causing the lane change control to intervene during the execution of the lane keep assist control in the traveling control apparatus according to the example embodiment. FIG. 2 illustrates the target traveling course switching timing conditions in making a lane change from a left lane to a right lane on a road having two lanes in each direction (hereinafter, referred to as a two-lane road). FIG. 3 illustrates the target traveling course switching timing conditions in making a lane change from a right lane to a left lane on a two-lane road. The examples illustrated in FIG. 2 and FIG. 3 are examples in a case where the lane boundary has a typical form, i.e., is a normal lane boundary line.

FIG. 2 conceptually illustrates how the lane change control is started, from a state in which the own vehicle 100 is traveling in a region within the left lane on a two-lane road having a normal lane boundary line, and a lane change is made to the right lane.

A road R may be marked with a lane line (hereinafter, referred to as a left lane line) 202L on the left road shoulder side, a lane boundary line 201 serving as a lane boundary, and a lane line (hereinafter, referred to as a right lane line) 202R on the right road shoulder side. In this case, the lane boundary line 201 may be, for example, a normal lane boundary line including a dashed line marking of a single white line. The road R may include an own lane R1 on which the own vehicle is traveling and an adjacent lane R2 adjacent to the right side of the own lane R1. The own lane R1 may be a lane on the left side as seen from the driver of the own vehicle 100, i.e., a left lane. The adjacent lane R2 may be a lane on the right side as seen from the driver of the own vehicle 100, i.e., a right lane.

The own lane R1 may be a region between the left lane line 202L and the lane boundary line 201. The adjacent lane R2 may be a region between the lane boundary line 201 and the right lane line 202R.

On the own lane R1 may be set the two target setting lines EL and ER of the target traveling course for the lane keep assist control. These two target setting lines EL and ER may be virtually set inside the traveling control apparatus 1 of the own vehicle. The left target setting line EL may be set along an inner edge, on the own lane R1 side, of the left lane line 202L. The right target setting line ER may be set along an inner edge, on the own lane R1 side, of the lane boundary line 201.

On the adjacent lane R2 may be set two expected target setting lines RL and RR of an expected target traveling course to be used on the adjacent lane R2 side in a case where the target traveling course is switched in the lane change control. These two expected target setting lines RL and RR may be virtually set inside the traveling control apparatus 1 of the own vehicle. The left expected target setting line RL may be set along an inner edge, on the adjacent lane R2 side, of the lane boundary line 201. The right expected target setting line RR may be set along an inner edge, on the adjacent lane R2 side, of the right lane line 202R.

In such a situation, assume that the own vehicle 100 is traveling while executing the lane keep assist control within the own lane R1. Also assume that the turn signal lever is operated on the basis of the driver's intention and the control of causing the lane change control to intervene is performed. In this case, the lane change control may be started in response to the driver's operation on the turn signal lever serving as the start trigger.

Upon the start of the lane change control, the own-vehicle position and own-vehicle traveling course estimator 22d may first set the lateral position of the own vehicle 100 at the control start time, i.e., the first lateral position. The first lateral position of the own vehicle 100 may be the position indicated by the reference sign C0 in FIG. 2. For example, a position where the two cameras, i.e., the main camera 21a and the sub-camera 21b, of the camera unit 21 are installed may correspond to the first lateral position. The first lateral position C0 may be indicated as a coordinate ER0 (see FIG. 2) on the right target setting line ER, i.e., the first target setting line, closer to the adjacent lane to which the lane change is to be made, out of the two target setting lines ER and EL of the target traveling course set within the own lane R1. The separation distance in a lateral direction between the first lateral position C0 of the own vehicle 100 and the coordinate ER0 at this time, and a positional relationship of the first lateral position C0 of the own vehicle 100 with respect to the right target setting line ER at this time may be indicated by an arrow denoted with a reference sign A0 in FIG. 2. In this case, a direction of the arrow may be expressed as follows: the right side in the lateral direction is a positive (+) side and the left side in the lateral direction is a negative (−) side. The same applies to the following description.

Next, the own-vehicle position and own-vehicle traveling course estimator 22d may determine the estimated traveling course along which the own vehicle 100 is to travel after the start of the lane change control, on the basis of the turning curvature and the estimated movement distance, in one second, of the own vehicle 100. The turning curvature may be estimated on the basis of the yaw rate and the vehicle speed of the own vehicle 100. The estimated movement distance in one second may be estimated on the basis of the vehicle speed. The estimated traveling course thus estimated may be indicated by a chain line and denoted with a reference sign S1 in FIG. 2.

Thereafter, the own-vehicle position and own-vehicle traveling course estimator 22d may estimate a second lateral position C1 where the own vehicle 100 is estimated to be present after a predetermined time period (e.g., one second) elapses from when the own vehicle 100 is present at the first lateral position C0 in a case where the own vehicle 100 travels along the estimated traveling course S1. The second lateral position C1 may be indicated as a coordinate ER1 (see FIG. 2) on the right target setting line ER, i.e., the first target setting line. The separation distance in the lateral direction between the second lateral position C1 of the own vehicle 100 and the coordinate ER1 at this time, and the positional relationship of the second lateral position C1 of the own vehicle 100 with respect to the right target setting line ER at this time may be indicated by an arrow denoted with a reference sign A1.

The own-vehicle position and own-vehicle traveling course estimator 22d may detect the coordinate ER0 on the right target setting line ER with respect to the first lateral position C0, and the coordinate ER1 on the right target setting line ER with respect to the second lateral position C1. Detected in this case may be the separation distance between the first lateral position C0 and the coordinate ER0, and the positional relationship in the lateral direction of the coordinate ER0 with respect to the first lateral position C0. Also detected in this case may be the separation distance between the second lateral position C1 and the coordinate ER1, and the positional relationship in the lateral direction of the coordinate ER1 with respect to the second lateral position C1.

A positive (+) or negative (−) sign may be used to express the positional relationship of the coordinate (ER0, ER1) on the right target setting line ER with respect to the lateral position (C0, C1) of the own vehicle. In this case, the positive sign (+) may indicate a case where the coordinate (ER0, ER1) on the right target setting line ER with respect to the lateral position (C0, C1) of the own vehicle is located in a right region with respect to the own vehicle in FIG. 2. The negative sign (−) may indicate a case where the coordinate (ER0, ER1) on the right target setting line ER with respect to the lateral position (C0, C1) of the own vehicle is located in a left region with respect to the own vehicle in FIG. 2.

The traveling control apparatus 1 according to the example embodiment performs switching of the target traveling course in a case where values obtained as a result of the detection each satisfy a predetermined condition regarding a predetermined threshold.

For example, the switching of the target traveling course may be executed in a case where two conditions of (1) a first threshold [Th1] (mm)≥the lateral position coordinate ER0 and (2) a second threshold [Th2] (mm)≥the lateral position coordinate ER1 are satisfied. In this case, the own vehicle 100 is about to make a lane change from the left lane to the right lane as described above, and the right target setting line ER is located on the right side with respect to the own vehicle 100, as illustrated in FIG. 2. Therefore, the sign of the first threshold [Th1] may be positive (+), and the sign of the second threshold [Th2] may be negative (−).

In other words, in the example illustrated in FIG. 2, assume a case where the own vehicle 100 traveling on the left lane R1 serving as the own lane makes a lane change to the right lane R2 serving as the adjacent lane after the lane change control is started on a two-lane road having a normal lane boundary line. In this case, the condition (1) may be satisfied in a case where the coordinate ER0 on the right target setting line ER, i.e., the first target setting line, with respect to the first lateral position C0 of the own vehicle 100 at a lane change start time becomes equal to or less than the first threshold [Th1] (mm). In other words, the condition (1) may be satisfied in a case where the own vehicle 100 approaches to fall within the first threshold [Th1] (mm) from the line ER as a result of moving from the left toward the right with respect to the line ER. The condition (2) may be satisfied in a case where, when the own vehicle 100 reaches the second lateral position C1 after traveling for one second along the estimated traveling course S1 from the first lateral position C0, the coordinate ER1 on the right target setting line ER with respect to the second lateral position C1 becomes equal to or less than the second threshold [Th2] (mm). In other words, the condition (2) may be satisfied in a case where the own vehicle 100 moves away from the line ER by the second threshold [Th2] (mm) or more to the right beyond the line ER. In a where the two conditions are satisfied, the own vehicle 100 may be regarded as having straddled the right target setting line ER of the target traveling course on the own lane R1 side to the adjacent lane side, and the target setting lines EL and ER of the target traveling course set on the own lane R1 may be switched to the adjacent lane R2 to which the lane change is to be made.

FIG. 3 illustrates a situation in making a lane change from the right lane to the left lane on a two-lane road having a normal lane boundary line. The situation in this case is assumed to be a situation similar to the situation illustrated in FIG. 2, i.e., the situation in making a lane change from the left lane to the right lane on the two-lane road having a normal lane boundary line, by reversing the left and the right.

In this case, the own vehicle 100 may be traveling on the own lane R2, and the adjacent lane in this case may be denoted with the reference sign R1, as illustrated in FIG. 3. In this situation, in a case where the own vehicle 100 makes a lane change from the own lane R2 (i.e., the right lane in FIG. 3) to the adjacent lane R1 (i.e., the left lane in FIG. 3), the target setting line EL of the target traveling course may serve as a target of determination of the timing of switching the target traveling course. The target traveling course switching timing conditions in this case may be, as illustrated in FIG. 3, (1) a third threshold [Th3] (mm)≤a lateral position coordinate EL0 and (2) a fourth threshold [Th4] (mm)≤a lateral position coordinate ELL The condition (1) may be satisfied in a case where the own vehicle 100 approaches to fall within the third threshold [Th3] (mm) from the line EL as a result of moving from the right toward the left with respect to the line EL. The condition (2) may be satisfied in a case where the own vehicle 100 moves away from the line EL by the fourth threshold [Th4] (mm) or more to the left beyond the line EL.

In this case, the own vehicle 100 is about to make a lane change from the right lane to the left lane as described above. Therefore, the situation of FIG. 3 is assumed to be in a mirror-symmetrical relationship with the above-described situation of FIG. 2. The left target setting line EL is accordingly located on the left side with respect to the own vehicle 100, as illustrated in FIG. 3. Therefore, the sign of the third threshold [Th3] may be negative (−), and the sign of the fourth threshold [Th4] may be positive (+). Note that the third threshold [Th3] may also be expressed by −[Th1], and the fourth threshold [Th4] may also be expressed by −[Th2].

In a case where these two conditions are satisfied, the own vehicle 100 may be regarded as having straddled the left target setting line EL in the target traveling course on the own lane R2 side to the adjacent lane side, and the target setting lines EL and ER of the target traveling course set on the own lane R2 may be switched to the adjacent lane R1 to which the lane change is to be made.

As described above, in performing the lane change control, the target traveling course set on the own lane may be switched to the adjacent lane to which a lane change is to be made, before the actual lane change is made. The switching may be performed at a predetermined timing that is after the start of the lane change control, during the execution of the lane change control, and before the completion of the lane change control, i.e., a timing when the two conditions are satisfied. This makes it possible to take over the control smoothly to the subsequent lane keep assist control.

The above-described examples illustrated in FIG. 2 and FIG. 3 are examples in a case where the lane boundary between the own lane and the adjacent lane, i.e., the lane boundary line 201 in FIG. 2 and FIG. 3, is a normal lane boundary line. However, markings on a road may include not only the normal lane boundary line, but also boundary markings of various forms, as described above.

For example, the lane boundary between the own lane and the adjacent lane may serve as a wide strip marking by taking various forms. On a road having such a lane boundary of a wide strip form (hereinafter, referred to as a wide lane boundary strip), applying the same conditions as in the case of the above-described normal lane boundary line, as the target traveling course switching conditions in performing the lane change control, can raise the following concerns.

Figure 4:
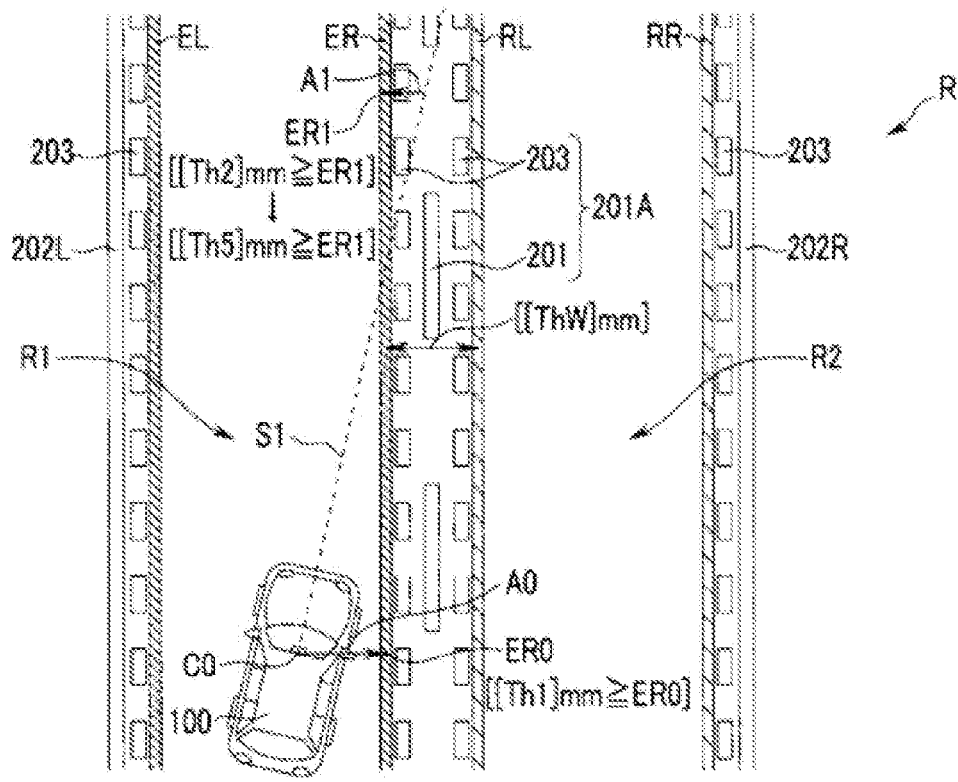
FIG. 4 is an explanatory diagram illustrating target traveling course switching timing conditions in performing the lane change control in the traveling control apparatus according to one example embodiment of the technology, in a case of a lane change from a left lane to a right lane on a road with a wide lane boundary strip.
Figure 5:
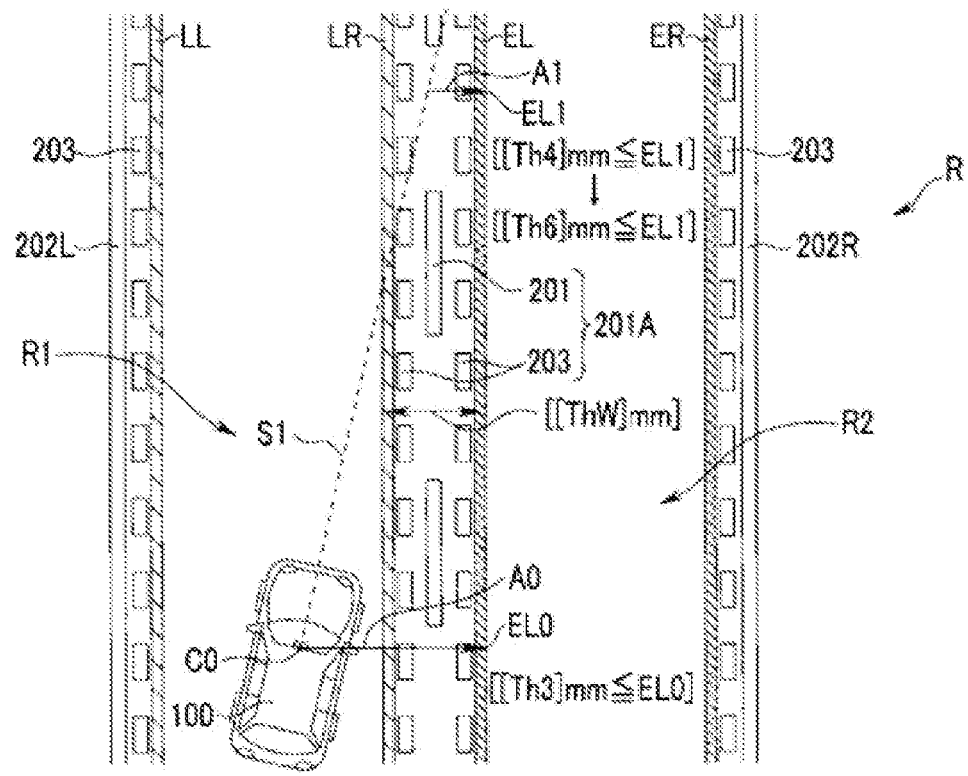
FIG. 5 is an explanatory diagram illustrating a situation in which hunting of a switching process occurs in a case where switching of the target traveling course is performed in the situation of FIG. 4.

FIG. 4 and FIG. 5 illustrate the concerns that can be raised in a case where, in the target traveling course switching control performed in a case of causing the lane change control to intervene during the execution of the lane keep assist control to make a lane change, the switching conditions applied to the normal lane boundary line are similarly applied to a wide lane boundary strip as well. FIG. 4 illustrates target traveling course switching timing conditions in making a lane change from a left lane to a right lane on a two-lane road having a wide lane boundary strip. FIG. 5 is an explanatory diagram illustrating a situation in which hunting of a switching process occurs in a case where the switching of the target traveling course is performed in the situation of FIG. 4. Note that, in FIG. 4 and FIG. 5, the same elements as in FIG. 2 and FIG. 3 are denoted with the same reference signs, and detailed description thereof is omitted.

FIG. 4 and FIG. 5 conceptually illustrate how the lane change control is started, from a state in which the own vehicle 100 is traveling in a region within the left lane on a two-lane road having a wide lane boundary strip, and a lane change is made to the right lane.

The example illustrated in FIG. 4 and FIG. 5 may be similar to the above-described examples illustrated in FIG. 2 and FIG. 3 in that the road R is marked with the left lane line 202L, the lane boundary line 201 serving as a lane boundary, and the right lane line 202R, and that the lane boundary line 201 is, for example, a dashed line marking of a single white line.

The example illustrated in FIG. 4 and FIG. 5 may differ from the above-described examples illustrated in FIG. 2 and FIG. 3 in that a short-dashed line marking 203 is marked at each of one side edge of the left lane line 202L on the inner side of the left lane, both side edges of the lane boundary line 201, and one side edge of the right lane line 202R on the inner side of the right lane. Non-limiting examples of the short-dashed line marking 203 may include deceleration marks and dotted-line marks. With such a form, the lane boundary illustrated in FIG. 4 and FIG. 5 may substantially include the lane boundary line 201 and the short-dashed line marking 203 at both side edges thereof, thus being wide in the lateral direction, to serve as a wide lane boundary strip 201A that is a lane boundary of a wide strip form. In this case, the lateral width dimension of the wide lane boundary strip 201A is assumed to be, for example, a dimension of about 500 mm or more.

The road R may include the own lane R1, i.e., the left lane, and the adjacent lane R2, i.e., the right lane, as in the examples illustrated in FIG. 2 and FIG. 3. The own lane R1 may be a region between the left lane line 202L and the wide lane boundary strip 201A. The adjacent lane R2 may be a region between the wide lane boundary strip 201A and the right lane line 202R.

The two target setting lines EL and ER of the target traveling course may be set on the own lane R1. The right target setting line ER, i.e., the first target setting line, may be set along one side edge, on the inner side of the own lane R1, of the short-dashed line marking 203 of the wide lane boundary strip 201A.

The two expected target setting lines RL and RR of the target traveling course to be used may be set on the adjacent lane R2. The left expected target setting line RL, i.e., the second target setting line, may be set along one side edge, on the inner side of the adjacent lane R2, of the short-dashed line marking 203 of the wide lane boundary strip 201A.

Assume that, in a case where the own vehicle 100 is traveling while executing the lane keep assist control within the own lane R1 on such a road R, the turn signal lever is operated on the basis of the driver's intention and the lane change control intervenes. In this case, the lane change control may be started in response to the driver's operation on the turn signal lever serving as the start trigger.

The situation in this case may be similar to the situation described with reference to FIG. 2. Therefore, in this case, switching of the target traveling course may be performed if the following two conditions are satisfied: (1) the first threshold [Th1] (mm)≥the lateral position coordinate ER0; and (2) the second threshold [Th2] (mm)≥the lateral position coordinate ER1.

In other words, assume a case where the own vehicle 100 traveling on the left lane R1 serving as the own lane makes a lane change to the right lane R2 serving as the adjacent lane after the lane change control is started on the two-lane road R having a wide lane boundary strip. In this case, the condition (1) may be satisfied in a case where the coordinate ER0 on the right target setting line ER, i.e., the first target setting line, with respect to the first lateral position C0 of the own vehicle 100 at the lane change start time becomes equal to or less than the first threshold [Th1] (mm). In other words, the condition (1) may be satisfied in a case where the own vehicle 100 approaches to fall within the first threshold [Th1] (mm) from the line ER as a result of moving from the left toward the right with respect to the line ER. The condition (2) may be satisfied in a case where, when the own vehicle 100 reaches the second lateral position C1 after traveling for one second along the estimated traveling course S1 from the first lateral position C0, the coordinate ER1 on the right target setting line ER with respect to the second lateral position C1 becomes equal to or less than the second threshold [Th2] (mm). In other words, the condition (2) may be satisfied in a case where the own vehicle 100 moves away from the line ER by the second threshold [Th2] (mm) or more to the right beyond the line ER. In a where the two conditions are satisfied, the own vehicle 100 may be regarded as having straddled the right target setting line ER of the target traveling course on the own lane R1 side to the adjacent lane side, and the target setting lines EL and ER of the target traveling course set on the own lane R1 may be switched to the adjacent lane R2 to which the lane change is to be made.

If the switching of the target traveling course is thus performed in the situation illustrated in FIG. 4, the situation becomes a situation illustrated in FIG. 5. FIG. 5 illustrates a situation in which the target traveling course (EL and ER) set on the own lane R1 side in FIG. 4 is switched to the adjacent lane R2 side. At this time, the own vehicle 100 is present at a position immediately after the switching of the target traveling course. This position is a position reached by further traveling a little along the estimated traveling course S1 from the position immediately before the switching illustrated in FIG. 4. However, the movement distance is assumed not to be so long.

When the situation changes from the situation illustrated in FIG. 4 to the situation illustrated in FIG. 5, the traveling control apparatus 1 of the own vehicle 100 erroneously determines that the own vehicle 100 is about to make a lane change by straddling the target setting line EL from the left side to the right side. The traveling control apparatus 1 thus makes determination regarding the two conditions, for the switching of the target traveling course, with respect to the target setting line EL.

In the situation illustrated in FIG. 5, the target setting line EL serving as a target of the condition determination is present at one side edge of the wide lane boundary strip 201A on the inner side of the adjacent lane R2. Therefore, the two conditions of (1) the third threshold [Th3] (mm)≤the lateral position coordinate EL0 and (2) the fourth threshold [Th4] (mm)≤the lateral position coordinate EL1, i.e., the conditions with respect to the target setting line EL, are satisfied in this situation. Therefore, the following malfunction can occur in this case: the traveling control apparatus 1 regards the own vehicle 100 as having straddled the left target setting line EL of the target traveling course, and erroneously switches the target setting lines EL and ER of the target traveling course set on the adjacent lane R2 side to the original own lane R1 side.

The situation thus returns to a situation substantially similar to the situation of FIG. 4. At this time, the own vehicle 100 is present at a position reached by further traveling a little along the estimated traveling course S1, but the movement distance is not so long. Therefore, after the situation becomes the same as that described with reference to FIG. 4 again, switching can occur again. Thus, the malfunction can be repeated until the own vehicle 100 further travels and the situation becomes a situation in which the two conditions are not satisfied. This can make the traveling of the own vehicle 100 unstable, or can force the lane change control to be canceled, for example.

Hence, in recognizing the road situation in advance, the traveling control apparatus 1 according to the example embodiment may acquire width information of the lane boundary. The switching parameters of the conditions for the switching of the target traveling course to be performed in the lane change control may be calculated and set in accordance with the recognition result of the lane boundary. Different switching parameters may be set between a case where the lane boundary is a wide lane boundary strip and a case where the lane boundary is a normal lane boundary line.

In identifying the type of the lane boundary, i.e., whether it is a normal lane boundary line or a wide lane boundary strip, dimension measurement based on image information may be performed for the lane boundary itself. The dimension measurement may be performed on the basis of information regarding the lane boundary recognized from a camera image. However, the traveling control apparatus 1 according to the example embodiment may determine the type of the lane boundary on the basis of the target setting lines of the target traveling course set on the basis of the recognized lane boundary, by focusing on the spacing between the target setting lines set at both side edges of the lane boundary. This will be described later.

For convenience of description, an expression such as a width dimension of the lane boundary may simply be used in the following description. This is based on an idea that the width dimension of the lane boundary and the dimension of the spacing between the target setting lines are substantially equivalent to each other.

For example, assume that the lane boundary is determined as being a wide lane boundary strip in a case where the width dimension of the lane boundary is equal to or greater than a predetermined threshold [ThW] (mm). In other words, the traveling control apparatus 1 according to the example embodiment may use [ThW] (mm) as the predetermined threshold for a width of a wide lane boundary strip, and treat a lane boundary with a width equal to or greater than the threshold [ThW] (mm) as a wide lane boundary strip. The traveling control apparatus 1 may use the switching parameters described with reference to FIG. 2 and FIG. 3 as the switching parameters of the target traveling course switching conditions in a case of a normal lane boundary line. In a case of a wide lane boundary strip, the switching parameters of the target traveling course switching conditions may be as follows, for example. For a lane change from the left lane to the right lane, the target traveling course is switched in a case where two conditions of (1) the first threshold [Th1] (mm)≥the lateral position coordinate ER0 and (2) a fifth threshold [Th5] (mm)≥the lateral position coordinate ER1 (see FIG. 4) are satisfied. For a lane change from the right lane to the left lane, the target traveling course is switched a case where two conditions of (1) the third threshold [Th3] (mm)≤the lateral position coordinate EL0 and (2) a sixth threshold [Th6] (mm)≤the lateral position coordinate EL1 (see FIG. 5) are satisfied.

The first threshold [Th1] (mm) in a case of a lane change from the left to the right may be the same as that used in the above-described situation of FIG. 2. The third threshold [Th3] (mm) in a case of a lane change from the right to the left may be the same as that used in the above-described situation of FIG. 3.

The corrected switching parameters (i.e., thresholds) at the lateral position coordinates ER1 and EL1 indicating the second lateral positions after one second, i.e., the fifth threshold [Th5] (mm) and the sixth threshold [Th6] (mm), in a case of a wide lane boundary strip may be calculated by using a predetermined arithmetic expression.

In this manner, the traveling control apparatus 1 according to the example embodiment may determine whether the lane boundary is a normal lane boundary line or a wide lane boundary strip, on the basis of a result of the recognition by the traveling environment recognizer 21*d*. In a case where the lane boundary is determined as being a wide lane boundary strip, the traveling control apparatus 1 may acquire width dimension information of the wide lane boundary strip. In accordance with the acquired width dimension information, the switching parameter calculator 22*f* may calculate and set correction values for the switching parameters (i.e., thresholds) corresponding to the width dimension of the wide lane boundary strip.

As described above, in a case where the lane boundary recognized by the traveling environment recognizer 21*d* is a wide lane boundary strip, the switching parameters may be calculated and set in accordance with the width dimension information of the wide lane boundary strip. Thus, in a case where the own vehicle 100 switches, under the lane change control, the target setting lines EL and ER of the target traveling course on the own lane R1 to the adjacent lane R2 to which the lane change is to be made in the situation of FIG. 4, resulting in the situation of FIG. 5, the conditions corresponding to a wide lane boundary strip are not satisfied even if the determination is executed regarding the switching conditions with respect to the target setting line EL after the switching. This makes it possible to prevent occurrence of hunting of the switching process.

In addition, as described above, the switching parameters to be used to switch the target traveling course in the lane change control may be set as follows. The switching parameter corresponding to the recognized lane boundary may be calculated and set as appropriate, in accordance with the recognition result of the lane boundary, in a case where the lane boundary is determined as being a wide lane boundary strip, i.e., a case where the width of the lane boundary is determined as being equal to or greater than the predetermined threshold [ThW] (mm). This makes it possible to perform a natural and stable lane change control without awkwardness at all times, regardless of the state of the lane boundary of the road, and also to take over the control smoothly to the subsequent lane keep assist control. Note that, in the following description, the switching parameter to be used in a case of a normal lane boundary line, i.e., a case where the width of lane boundary is less than the predetermined threshold [ThW] (mm), may be referred to as a "normal switching parameter" or a first switching parameter. The switching parameter determined by calculation to be used in a case of a wide lane boundary strip, i.e., a case where the width of the lane boundary is equal to or greater than the predetermined threshold [ThW] (mm), may be referred to as a "wide-strip switching parameter" or a second switching parameter.

In the lane change control that intervenes during the execution of the lane keep assist control, as described above, the process of switching the target traveling course within the own lane to the adjacent lane to which a lane change is to be made may be performed at a predetermined timing before the own vehicle actually straddles the lane boundary, during the execution of the lane change control.

After the completion of the lane change control including a series of processes, the traveling control apparatus 1 may resume the original lane keep assist control, acquire surrounding environment information within the own lane on which the own vehicle travels after the lane change, recognize a preceding vehicle, for example, within the own lane, and execute a control such as preceding vehicle following control.

In this case, if the lane change control intervenes during the execution of the lane keep assist control, a "switching flag" indicating the target traveling course switching timing may be set, for example, in a program of the control. At a time when the switching flag is set, or the target traveling course switching timing, the own vehicle may actually be in a phase before straddling the target setting line of the target traveling course, i.e., the lane boundary. From this time, the traveling control apparatus 1 according to the example embodiment may start various actions for the lane keep assist control to be performed within the own lane after the lane change. For example, a process of collecting the surrounding environment information, and recognizing a preceding vehicle, for example, within the own lane after the lane change may be started.

However, in a case where the lane change control is caused to intervene during the execution of the lane keep assist control, as described above, the timing of switching the target traveling course in a case of using the switching parameter corresponding to a wide lane boundary strip is delayed a little, as compared with a case of using the switching parameter corresponding to a normal lane boundary line. Accordingly, the timing when the switching flag is set is also delayed.

In this case, if the timing of switching the target traveling course is delayed, causing a delay in the timing when the switching flag is set, the timing of starting the various actions for the lane keep assist control to be performed within the own lane after the lane change can also be delayed, for example. This can cause a delay in recognition of a preceding vehicle, for example, in the lane keep assist control to be performed within the own lane after the lane change. This can make it difficult to smoothly resume the preceding vehicle following control, for example, in the lane keep assist control.

Hence, in the lane change control caused to intervene during the execution of the lane keep assist control, in a case of using the switching parameter corresponding to a wide lane boundary strip, the traveling control apparatus 1 according to the example embodiment may set a "pre-switching flag" indicating that the target traveling course will soon be switched, at a predetermined timing before setting the switching flag indicating the target traveling course switching timing. In this case, the timing of setting the pre-switching flag may be a timing corresponding to the switching timing in a case where the switching parameter corresponding to a normal lane boundary line is used.

As described above, in a case where the switching parameter corresponding to a normal lane boundary line is used, setup for the lane keep assist control to be performed within the own lane after the lane change may be performed in response to the switching flag. In a case where the switching parameter corresponding to a wide lane boundary strip is used, the setup for the lane keep assist control to be performed within the own lane after the lane change may be performed in response to the pre-switching flag and the switching flag.

Thus, even if the use of the switching parameter corresponding to a wide lane boundary strip causes a delay in the timing of switching the target traveling course, it is possible to perform the setup for the lane keep assist control to be performed within the own lane after the lane change, at a control timing equivalent to the timing in a case where the switching parameter corresponding to a normal lane boundary line is used. This makes it possible to smoothly perform the control takeover to the lane keep assist control after the completion of the lane change control.

Figure 6:
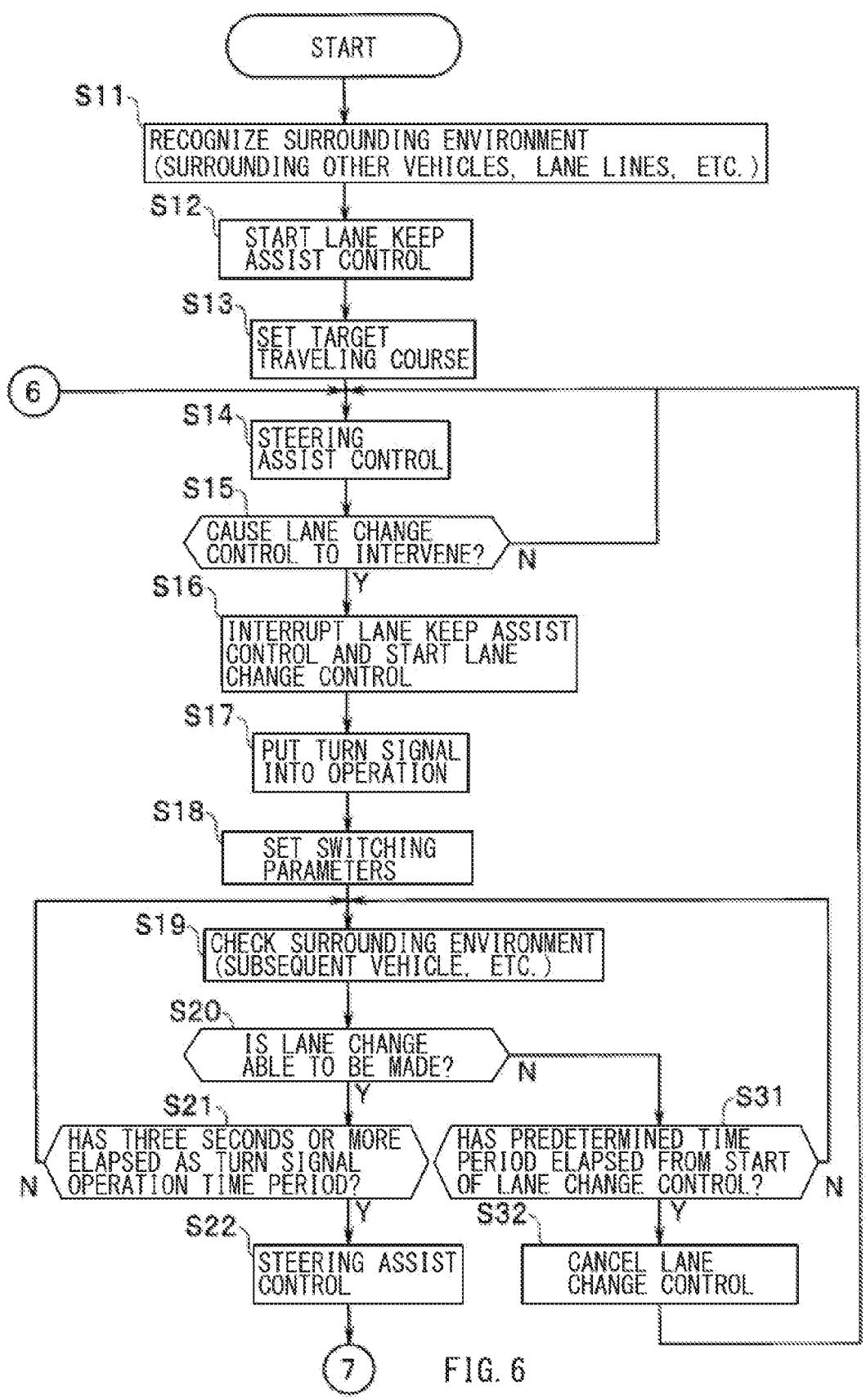
FIG. 6 is a first half of a flowchart illustrating an outline of a process sequence when the lane change control intervenes during execution of a lane keep assist control that is performed in the traveling control apparatus according to one example embodiment of the technology.
Figure 7:
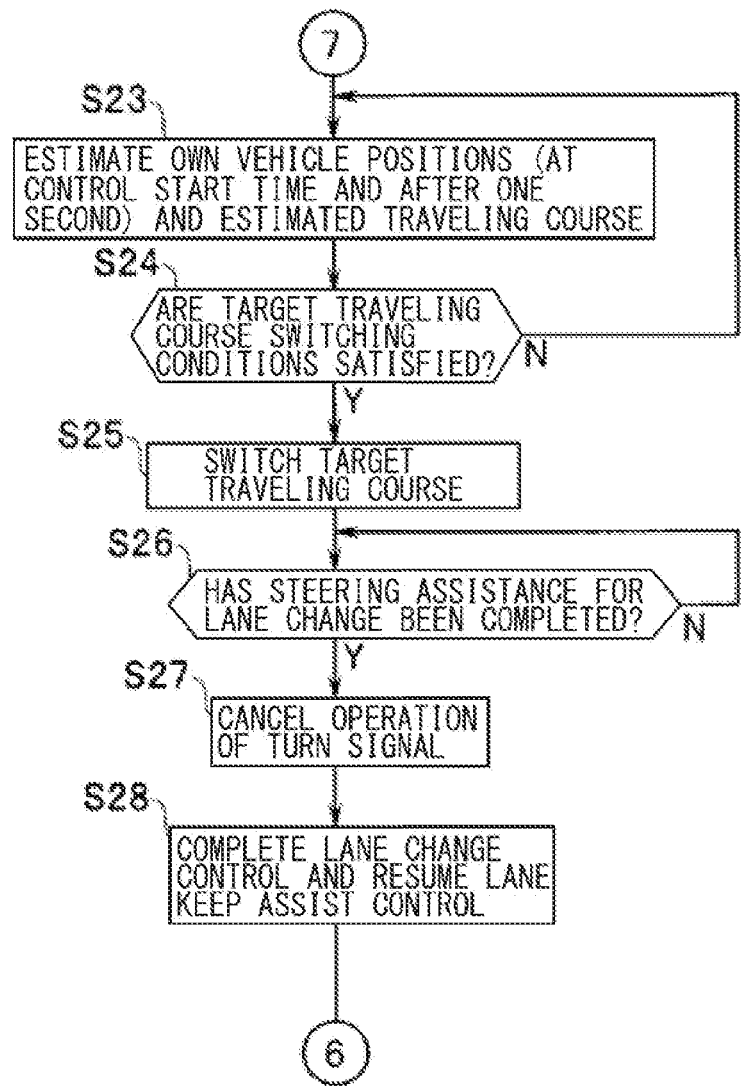
FIG. 7 is a second half of the flowchart illustrating the outline of the process sequence when the lane change control intervenes during the execution of the lane keep assist control that is performed in the traveling control apparatus according to one example embodiment of the technology.

A description is given next of an example working when the lane change control intervenes during the execution of the lane keep assist control performed in the traveling control apparatus 1 according to the example embodiment, with reference to FIG. 6 and FIG. 7. FIG. 6 and FIG. 7 illustrate, as a flowchart, an outline of a process sequence when the lane change control intervenes during execution of the lane keep assist control that is performed in the traveling control apparatus according to the example embodiment.

When the traveling control apparatus 1 according to the example embodiment mounted on the own vehicle 100 is activated, the units including the camera unit 21, the surrounding monitoring unit 20, and the traveling control unit 22 may start operation. First, in step S11 of FIG. 6, the traveling control unit 22 may start the process of recognizing the front environment and the surrounding environment of the own vehicle, by means of the surrounding environment recognizer 20b and the traveling environment recognizer 21d, for example.

The surrounding environment recognizer 20b and the traveling environment recognizer 21d may recognize the front and surrounding environments including, for example, the left and right lane lines of the own lane and the adjacent lane. The surrounding environment recognizer 20b and the traveling environment recognizer 21d may also recognize and identify the type of the left and right lane lines, for example. In addition, the traveling control unit 22 may detect the state of the own vehicle itself. Non-limiting examples of the state of the own vehicle itself may include the vehicle speed and the type of the selected traveling assist control. The surrounding environment recognition process in step S11 may be performed continuously at all times while the traveling control apparatus 1 is in operation.

Note that the driver may be allowed to freely perform selective ON-OFF setting of operations related to the traveling assistance, such as the lane keep assist control, by operating, for example, various operation members included in the mode switching switch 33. However, to simplify the description, assume in the example embodiment that an instruction signal for the execution of the lane keep assist control is already in the ON state at a time of the process of step S11.

In subsequent step S12, the traveling control unit 22 may start the lane keep assist control.

In subsequent step S13, the traveling control unit 22 may cause the target traveling course setting section 22b, for example, to set the target traveling course for the lane keep assist control on the basis of the information on the left and right lane lines of the own lane recognized in the process of step S11. The target traveling course may include, for example, the target setting lines EL and ER and the lane center position of the own lane. At this time, the lane boundary between the own lane and the adjacent lane may also have been recognized. Accordingly, for example, the traveling control unit 22 may also estimate and set at least one (the setting line closer to the own lane) of the target setting lines of the target traveling course predicted to be set on the lane on which the own vehicle is to travel in a case where a lane change is made, i.e., the adjacent lane at the current time.

The process of setting the target traveling course may also be performed continuously at all times during the execution of the lane keep assist control, as with the surrounding environment recognition process. In other words, the vehicle that is traveling while executing the lane keep assist control may be in a situation in which a situation of lane lines, for example, is changing at all times. Therefore, the traveling control apparatus 1 may recognize the surrounding environment at all times while the vehicle is traveling, and perform a control such as resetting various items in accordance with the recognized information on the surrounding environment. In other words, in a case where a change in the situation of the lane lines, for example, is recognized while the vehicle is traveling, the setting of the target traveling course may also be changed appropriately, in accordance with the recognized information.

In subsequent step S14, the traveling control unit 22 may cause the steering assist controller 22a, for example, to execute a predetermined steering assist control that allows the own vehicle to travel along the set target traveling course.

In step S15, the traveling control unit 22 may check whether an instruction signal for the execution of the lane change control has been generated. Non-limiting examples of the instruction signal for the intervention of the lane change control may include an instruction signal supplied in response to the turn signal lever operation performed by the driver. In this case, if the turn signal lever operation is performed, for example, and an instruction to cause the lane change control to intervene is confirmed (step S15; Y), the traveling control unit 22 may cause the flow to proceed to the process of step S16. In a case where an instruction signal for the intervention of the lane change control is not confirmed (step S15; N), the traveling control unit 22 may cause the flow to return to the above-described process of step S14, and repeat the execution of the steering assist control based on the lane keep assist control.

In step S16, the traveling control unit 22 may interrupt the lane keep assist control being executed, and start the execution of the lane change control.

In this case, in step S17, the traveling control unit 22 may first put, into blinking operation, the turn signal on the adjacent lane side corresponding to a direction in which the lane change is to be made as desired by the driver, in accordance with the instruction signal supplied in response to the inputted operation.

In step S18, the traveling control unit 22 may set the switching parameters to be used to set the timing of switching the target traveling course during the execution of the lane change control, on the basis of the latest lane line information, for example, acquired by the surrounding environment recognition process being executed continuously at all times. The traveling control unit 22 may first determine, on the basis of the target setting lines of the target traveling course set on the basis of the recognized lane boundary, whether the spacing between the target setting lines set at both side edges of the lane boundary is less than or equal to or greater than the predetermined threshold [ThW] (mm). If a result of the determination is less than the predetermined threshold, the traveling control unit 22 may set the normal switching parameter. If the determination result is equal to or greater than the predetermined threshold, the traveling control unit 22 may calculate the wide-strip switching parameter in accordance with the width dimension of the recognized lane boundary, and set the obtained wide-strip switching parameter.

In step S19, the traveling control unit 22 may check the surrounding environment of the own vehicle, and determine whether the lane change control that is about to be performed is able to be performed safely and reliably.

Non-limiting examples of the checking of the surrounding environment performed in this step may include recognizing presence of an adjacent lane, and checking whether a side-by-side vehicle and a subsequent vehicle, for example, are present on the adjacent lane. In addition, the traveling control unit 22 may recognize the lane boundary between the adjacent lane to which the lane change is to be made, and the own lane on which the own vehicle is currently traveling, and may check information regarding the target setting lines, of the target traveling course, set at both side edges of the lane boundary. The traveling control unit 22 may check, for example, the information regarding the spacing between the target setting lines set across the lane boundary, i.e. the target setting line on the own lane side, and the target setting line on the current adjacent lane side to be used after the lane change.

In step S20, the traveling control unit 22 may check whether the own vehicle at the current time is in a situation in which a lane change is able to be made. In a case where the own vehicle is determined as being in a situation in which a lane change is able to be made (step S20; Y), the traveling control unit 22 may cause the flow to proceed to the process of step S21. In a case where the own vehicle is determined as not being in a situation in which a lane change is able to be made (step S20; N), the traveling control unit 22 may cause the flow to proceed to the process of step S31.

In step S31, the traveling control unit 22 may check, while continuing to travel while keeping the lane, whether a predetermined time period has elapsed from the start of the lane change control (i.e., from the turn signal lever operation). In a case where the elapse of the predetermined time period is confirmed (step S31; Y), the traveling control unit 22 may cause the flow to proceed to the process of subsequent step S32. In a case where the predetermined time period has not elapsed (step S31; N), the traveling control unit 22 may cause the flow to return to the above-described process of step S19, while continuing to travel while keeping the lane.

In step S32, the traveling control unit 22 may cancel the continuous process of the lane change control being executed, may cause the flow to return to the above-described process of step S14, return to the state before the intervention of the lane change control, i.e., the interrupted lane keep assist control, and continue to travel within the own lane. Note that a predetermined warning may be presented, for example, when the process of cancelling the lane change control is performed.

The process of cancelling the lane change control may not be performed. As an alternative process, for a predetermined time period, the own vehicle may be caused to wait for a lane change while keeping the turn signal lamp blinking and continuing to travel while keeping the lane, and the steering control for the lane change may be performed as soon as safety is confirmed. The predetermined time period may be, for example, until another vehicle inhibiting the lane change, such as a subsequent vehicle on the adjacent lane, becomes absent, i.e., until the surrounding environment becomes an environment in which a lane change may be made safely and reliably.

In a case where the own vehicle is determined as being in a situation in which a lane change is able to be made in the above-described process of step S20, and the flow proceeds to the process of step S21, the traveling control unit 22 may check, in step S21, whether three seconds or more has elapsed as a turn signal operation time period. In a case where it is confirmed that three seconds or more has elapsed as the turn signal operation time period (step S21; Y), the traveling control unit 22 may cause the flow to proceed to the process of subsequent step S22. In a case where the turn signal operation time period is less than three seconds (step S21; N), the traveling control unit 22 may cause the flow to return to the above-described process of step S19, while continuing to travel while keeping the lane.

In step S22, the traveling control unit 22 may execute the steering assist control for the lane change control as appropriate. Thereafter, the traveling control unit 22 may cause the flow to proceed to the process of step S23 of FIG. 7 (see a circled reference sign "7" in FIG. 6 and FIG. 7).

In step S23 of FIG. 7, the traveling control unit 22 may estimate the positions and the estimated traveling course of the own vehicle. For example, the traveling control unit 22 may estimate the first lateral position of the own vehicle at a predetermined time after the start of the lane change control (e.g., the control start time). The traveling control unit 22 may also estimate the estimated traveling course along which the own vehicle is to travel after the start of the steering assist control after the start of the lane change control. The traveling control unit 22 may also estimate the second lateral position of the own vehicle to be reached after a predetermined time period (e.g., one second) elapses from when the own vehicle is present at the first lateral position in a case where the own vehicle travels along the estimated traveling course.

In subsequent step S24, the traveling control unit 22 may make, prior to making a lane change, determination regarding the target traveling course switching conditions for the switching of the target traveling course on the own lane to the adjacent lane to which the lane change is to be made. As the target traveling course switching conditions, conditions included in the switching parameters already set in the above-described process of step S18 may be applied.

In a case where it is confirmed that the above-described two conditions for the switching of the target traveling course are both satisfied as a result of the determination by the above-described process of step S24 (step S24; Y), the traveling control unit 22 may perform, in step S25, the process of switching the target traveling course. In a case where the target traveling course switching conditions are not satisfied (step S24; N), the traveling control unit 22 may cause the flow to return to the above-described process of step S23.

In step S26, the traveling control unit 22 may check whether the steering assist control for the lane change control started in step S22 of FIG. 6 has been completed. If it is confirmed that the steering assist control for the lane change control has been completed (step S26; Y), the traveling control unit 22 may cause the flow to proceed to the process of subsequent step S27. In a case where the steering assist control for the lane change control has not been completed (step S26; N), the traveling control unit 22 may repeat the checking until this steering assist control is completed.

In step S27, the traveling control unit 22 may cancel the operation of the turn signal.

In subsequent step S28, the traveling control unit 22 may complete the lane change control being executed, and resume the original lane keep assist control. In other words, the traveling control unit 22 may cause the flow to return to the process of step S14 of FIG. 6 (see a circled reference sign "6" in FIG. 7 and FIG. 6), and return to the state before the intervention of the lane change control, i.e., the lane keep assist control.

As described above, according to the example embodiment of the technology, the traveling control apparatus 1 is configured to execute at least the lane keep assist control of causing the vehicle to travel along the target traveling course set within the traveling lane, and the lane change control of causing the vehicle traveling along the target traveling course to make a lane change to the adjacent lane. In a case where the lane change control is caused to intervene during the execution of the lane keep assist control, the traveling control apparatus 1 regards the own vehicle as having straddled the lane boundary between the own lane and the adjacent lane at a timing when a predetermined plurality of conditions are satisfied, and switches the target traveling course set on the own lane for the lane keep assist control to the adjacent lane to which the lane change is to be made.

Thus, it is possible to perform, in advance, various processes for the lane keep assist control to be resumed after the lane change control, in the phase before the own vehicle actually moves to the adjacent lane side under the lane change control. This makes it possible to perform the control takeover to the lane keep assist control after the completion of the lane change control, smoothly and continuously without an intermission.

The switching parameters to be used to set the timing of the switching of the target traveling course to be performed during the execution of the lane change control may be switched in accordance with the type of the lane boundary, i.e., a normal lane boundary line or a wide lane boundary strip. For example, a predetermined switching parameter may be used in a case of a normal lane boundary line, and a corresponding switching parameter may be calculated and set each time in a case of a wide lane boundary strip.

Thus, it is possible to suppress occurrence of unnecessary cancellation, for example, of the lane change control and unstable traveling, regardless of the type of the lane boundary, i.e., a normal lane boundary line or a wide lane boundary strip, between the traveling lane on which the own vehicle is traveling and the adjacent lane to which the lane change is to be made. This makes it possible to perform a natural and stable lane change control without awkwardness. It is also possible to achieve a stable traveling control by smoothly performing takeover to the lane keep assist control after the lane change control is completed.

The target setting line spacing determination section 22e may determine the spacing between the target setting lines set at both side edges of the normal lane boundary line or the wide lane boundary strip in the example embodiment, but is not limited to this example. For example, the target setting line spacing determination section 22e may determine, as a width of a lane boundary, a spacing (i.e., a line width or a strip width) between both side edges of the lane boundary, out of the left and right lane lines recognized by the traveling environment recognizer 21d.

The example embodiment describes that, in the traveling control apparatus 1, the traveling control unit 22 includes the elements including, for example, the own-vehicle position and own-vehicle traveling course estimator 22d, the target setting line spacing determination section 22e, and the switching parameter calculator 22f. However, the arrangement of these elements is not limited to the examples described above in the example embodiment. For example, these elements may be included in the traveling environment recognizer 21d.

The technology described above is not limited to the foregoing example embodiments, and various modifications may be made in the implementation stage without departing from the gist of the technology. Further, the foregoing example embodiments each include various stages of the technology, and various technologies may be extracted by appropriately combining the features of the technology disclosed herein. For example, in a case where the above-described concerns may be addressed and the above-described effects may be obtained even if some features are deleted from all the features disclosed herein, the remaining features may be extracted as a technology. Elements in different example embodiments may be combined as appropriate. The technology is limited only by the appended claims or the equivalents thereof, and is not limited by specific example embodiments thereof.

Each of the traveling environment recognizer 21d and the traveling control unit 22 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the traveling environment recognizer 21d and the traveling control unit 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the traveling environment recognizer 21d and the traveling control unit 22 illustrated in FIG. 1.

The invention claimed is:

1. A traveling control apparatus to be applied to a vehicle, the traveling control apparatus comprising one or more memories configured to store instructions and one or more processors configured to execute the instructions to:
   execute a first lane keep assist control that causes the vehicle to travel along a first target traveling course set within a first lane;
   acquire surrounding environment information that is information on a surrounding environment of the vehicle, and to recognize first and second side edges of a strip road marking placed between a center of the first lane and a center of a second lane based on the acquired surrounding environment information, the second lane being adjacent to the first lane, the first side edge being closer to the center of the first lane than the second side edge;
   when an instruction signal for lane change to the second lane is generated during execution of the first lane keep assist control, (i) stop the execution of the first lane keep assist control, and (ii) execute a lane change control that causes to depart from the first target driving course and direct the vehicle to inside the second lane;
   during execution of the lane change control, (i) set first and second thresholds based on a spacing between the first and second side edges of the strip road marking, (ii) acquire a first position that is a current position of a predetermined reference point of the vehicle, (iii) estimate a second position that is a position of the predetermined reference point after a predetermined time elapses, and (iv) determine whether all of predetermined conditions are satisfied, the predetermined conditions comprising:
      (a) the first position is located closer to the center of the first lane than the first side edge;
      (b) a first distance between the first position and the first side edge is equal to or less than the first threshold;
      (c) the second position is located closer to the center of the second lane than the first side edge; and
      (d) a second distance between the second position and the first side edge is equal to or greater than the second threshold;
   in response to determining that all of the predetermined conditions are not satisfied, continue the execution of the lane change control; and
   in response to determining that all of the predetermined conditions are satisfied, (i) stop the execution of the lane change control, and (ii) execute a second lane keep assist control that causes the vehicle to travel along a second target traveling course set within the second lane.

2. The traveling control apparatus according to claim 1, wherein the one or more processors are further configured to execute the instructions to:
   during the execution of the lane change control, determine whether the spacing between the first and second side edges is equal to or greater than a third threshold;
   in response to determining that the spacing between the first and second side edges is not equal to or greater than the third threshold, set the first threshold to a predetermined first value and set the second threshold to a predetermined second value; and
   in response to determining that the spacing between the first and second side edges is equal to or greater than the third threshold, set the first threshold to a third value different from the predetermined first value and set the second threshold to the predetermined second value.

3. A traveling control apparatus to be applied to a vehicle, the traveling control apparatus comprising
   circuitry configured to
   execute a first lane keep assist control that causes the vehicle to travel along a first target traveling course set within a first lane;
   acquire surrounding environment information that is information on a surrounding environment of the vehicle, and recognize first and second side edges of a strip road marking placed between a center of the first lane and a center of a second lane based on the acquired surrounding environment information, the second lane being adjacent to the first lane, the first side edge being closer to the center of the first lane than the second side edge;
   when an instruction signal for lane change to the second lane is generated during execution of the first lane keep assist control, (i) stop the execution of the first lane keep assist control, and (ii) execute a lane change control that causes to depart from the first target driving course and direct the vehicle to inside the second lane;
   during execution of the lane change control, (i) set first and second thresholds based on a spacing between the first and second side edges of the strip road marking, (ii) acquire a first position that is a current position of a predetermined reference point of the vehicle, (iii) estimate a second position that is a position of the predetermined reference point after a predetermined time elapses, and (iv) determine whether all of predetermined conditions are satisfied, the predetermined conditions comprising:
      (a) the first position is located closer to the center of the first lane than the first side edge;
      (b) a first distance between the first position and the first side edge is equal to or less than the first threshold;
      (c) the second position is located closer to the center of the second lane than the first side edge; and (d) a second distance between the second position and the first side edge is equal to or greater than the second threshold;

in response to determining that all of the predetermined conditions are not satisfied, continue the execution of the lane change control; and in response to determining that all of the predetermined conditions are satisfied, (i) stop the execution of the lane change control, and (ii) execute a second lane keep assist control that causes the vehicle to travel along a second target traveling course set within the second lane.

4. The traveling control apparatus according to claim 3, wherein the circuitry is further configured to:

during the execution of the lane change control, determine whether the spacing between the first and second side edges is equal to or greater than a third threshold;

in response to determining that the spacing between the first and second side edges is not equal to or greater than the third threshold, set the first threshold to a predetermined first value and set the second threshold to a predetermined second value; and in response to determining that the spacing between the first and second side edges is equal to or greater than the third threshold, set the first threshold to a third value different from the predetermined first value and set the second threshold to the predetermined second value.

5. The traveling control apparatus according to claim 2, wherein the one or more processors are further configured to execute the instructions to calculate the third value by using a predetermined arithmetic expression.

6. The traveling control apparatus according to claim 4, wherein the circuitry is further configured to calculate the third value by using a predetermined arithmetic expression.

7. The traveling control apparatus according to claim 2, wherein the third value is greater than the predetermined first value.

8. The traveling control apparatus according to claim 4, wherein the third value is greater than the predetermined first value.

9. The traveling control apparatus according to claim 5, wherein the third value is greater than the predetermined first value.

10. The traveling control apparatus according to claim 6, wherein the third value is greater than the predetermined first value.

* * * * *